(12) United States Patent
Johnson

(10) Patent No.: US 9,561,731 B2
(45) Date of Patent: Feb. 7, 2017

(54) STRUCTURAL BOLLARD ASSEMBLY FOR ELECTRIC VEHICLE INFRASTRUCTURE

(71) Applicant: Brightfield Transportation Solutions, Inc., Asheville, NC (US)

(72) Inventor: Matthew E. Johnson, Asheville, NC (US)

(73) Assignee: Brightfield Transportation Solutions, Inc., Asheville, NC (US)

( * ) Notice: Subject to any disclaimer, the term of this patent is extended or adjusted under 35 U.S.C. 154(b) by 968 days.

(21) Appl. No.: 13/714,018

(22) Filed: Dec. 13, 2012

(65) Prior Publication Data

US 2013/0229141 A1    Sep. 5, 2013

Related U.S. Application Data

(60) Provisional application No. 61/569,849, filed on Dec. 13, 2011.

(51) Int. Cl.
| | |
|---|---|
| *H02J 7/00* | (2006.01) |
| *B60L 11/18* | (2006.01) |
| *G06Q 10/06* | (2012.01) |

(52) U.S. Cl.
CPC ........ *B60L 11/1824* (2013.01); *B60L 11/1816* (2013.01); *B60L 11/1825* (2013.01); *G06Q 10/06315* (2013.01); *Y02T 10/7005* (2013.01); *Y02T 10/7072* (2013.01); *Y02T 10/7094* (2013.01); *Y02T 90/121* (2013.01); *Y02T 90/128* (2013.01); *Y02T 90/14* (2013.01); *Y10T 29/49623* (2015.01)

(58) Field of Classification Search
USPC ......................................................... 320/109
See application file for complete search history.

(56) References Cited

U.S. PATENT DOCUMENTS

| | | |
|---|---|---|
| 5,847,537 A | 12/1998 | Parmley, Sr. |
| 7,248,018 B2 | 7/2007 | Sanders, Jr. et al. |
| 7,637,075 B2 | 12/2009 | Mitchell |
| 7,694,487 B1 | 4/2010 | Ryan |
| 7,779,588 B1 | 8/2010 | Bruning |
| 7,874,126 B2 | 1/2011 | Fournier |
| 7,952,325 B2 | 5/2011 | Baxter et al. |
| 8,013,569 B2 | 9/2011 | Hartman |
| 8,022,667 B2 | 9/2011 | Anderson |
| 8,072,182 B2 | 12/2011 | Vasilantone |
| 8,087,846 B2 | 1/2012 | Ringelberg |
| 8,089,747 B2 | 1/2012 | Storck et al. |
| 8,111,043 B2 | 2/2012 | Redmann |
| 8,299,754 B2 | 10/2012 | Hayashigawa et al. |
| 8,307,967 B2 | 11/2012 | Patwardhan |

(Continued)

*Primary Examiner* — Samuel Berhanu
(74) *Attorney, Agent, or Firm* — McHale & Slavin, P.A.

(57) ABSTRACT

The invention disclosed herein is directed to electric vehicle ("EV") infrastructure, which includes a customizable charging station that comprises a modular bollard assembly having a structural tubular form that is secured to an electrical vehicle supply equipment to provide fuel to an EV. The modular bollard assembly is optionally fashioned with expansion elements, such as a solar canopy, which accommodate EV infrastructure requirements. The invention also includes methods of determining and manufacturing EV infrastructure based upon data pertaining to demographic, energy, EV, financial and geographic metrics.

21 Claims, 17 Drawing Sheets

(56) References Cited

U.S. PATENT DOCUMENTS

| | | | |
|---|---|---|---|
| 8,558,504 B2* | 10/2013 | Brown | B60L 3/0069 |
| | | | 320/109 |
| 2010/0225266 A1* | 9/2010 | Hartman | B60L 11/1822 |
| | | | 320/101 |
| 2010/0232876 A1* | 9/2010 | Ringelberg | E01F 13/028 |
| | | | 404/6 |
| 2010/0296230 A1* | 11/2010 | Storck | B60L 11/1818 |
| | | | 361/641 |
| 2011/0127946 A1* | 6/2011 | Anderson | B60L 11/1818 |
| | | | 320/101 |

* cited by examiner

US 9,561,731 B2

STRUCTURAL BOLLARD ASSEMBLY FOR ELECTRIC VEHICLE INFRASTRUCTURE

REFERENCE TO RELATED APPLICATIONS

In accordance with 37 C.F.R. 1.76, a claim of priority is included in an Application Data Sheet filed concurrently herewith. Accordingly, the present invention claims priority under 35 U.S.C. §119(e), 120, 121, and/or 365(c) to U.S. Provisional Patent Application No. 61/569,849, filed, Dec. 13, 2011, entitled "Electric Vehicle Infrastructure," the contents of which is incorporated herein in its entirety.

FIELD OF THE INVENTION

The present invention generally relates to modular and expandable structures, and more particularly to a modular bollard assembly that provides charging for electric and hybrid vehicles while providing structural support for overhead structures.

BACKGROUND

Continual increases in transportation fuel prices, as well as the growing importance of greenhouse gas emission reduction, has led the automotive industry and governments around the world to reevaluate the importance of the electric vehicle (EV). A number of landmark events have occurred since the launch of the EV1s by General Motors in California in the late 1980s. For instance, the American Recovery and Reinvestment Act of 2009 provided substantial funding to EV technologies, which was reinforced by a surge of private investment in the EV marketplace. Also, in 2010, the J-1772 Plug was accepted by the SAE as the global standard for Level 2 charging interface between vehicles and chargers. Further, the introduction of new battery technologies, particularly the advancement of Lithium-Ion batteries, has greatly improved the energy density of the battery stacks and provided impetus to both automotive designers and industry executives. These advances have spurred dozens of companies to enter the marketplace with various electric vehicle supply equipment ("EVSE"), such as chargers, etc. Accordingly, most automotive makers either produce, or plan to produce, some kind of EV.

Electric vehicles have many environmental benefits over conventional internal combustion automobiles. For instance, EVs promote a reduction of urban air pollution because they do not emit harmful tailpipe pollutants. Even EVs with an onboard source of power for battery charging (i.e. Hybrid EV) can provide reduced pollutants and greenhouse gas emissions. However, despite the environmental benefits, the widespread adoption of electric cars faces several obstacles and limitations. One of the primary challenges with any EV is the range of operation and the related time to charge. Therefore, there is a need in the art for recharging infrastructures to promote the use of electric vehicles.

The lack of EV infrastructure not only presents physical limitations (e.g., limited range), but also contributes to the driver's fear of the batteries running out of energy before reaching their destination (range anxiety). Accordingly, many consumers are reluctant to invest in an EV as their primary vehicle. As new vehicles are introduced into the marketplace, the challenge of finding publicly accessible charging stations will only become increasingly difficult. Although most consumers will charge at home overnight, they must feel supported in their decision to buy an EV.

Several attempts to provide EV infrastructure exist in the art. However, no existing infrastructure offers a successful flexible solution that can be systematically adapted and/or expanded to effectively integrate into preexisting transportation, structural, and power infrastructure for predetermined community-scaled use.

For example, U.S. Pat. No. 7,637,075 discloses a reinforced pole structure. The pole structure includes a hollow pole with an interior surface, a hand access hole near the bottom end, and a base plate to which the bottom end of the pole is secured. The reinforced pole structure also includes an elongate reinforcement device, preferably in the form of two elongate reinforcers fitted against the interior surface of the hollow pole, the lower edges of the reinforcers being welded to the pole at the bottom end and the hole-adjacent edge(s) of the reinforcers being welded to the lip of the hand-hole. However, the '075 patent makes no disclosure relating to attaching additional building structure to the top of the pole or to placing a charging station within the confines of the pole.

U.S. Pat. No. 7,694,487 discloses a tubular post for a light or other electrical device mounted in soil with the use of an anchor which is comprised of a vertical sleeve and a flange which extends horizontally from the lower end of the sleeve. A flat bottom excavation is made in soil to receive the anchor. Electrical conductors are run across the top of the flange, through ports in the sleeve and up the interior of the post. A stop within the bore of the sleeve limits downward movement of the post which is inserted into the top of the bore, to enable the running of the conductors through the ports. The excavation is then backfilled. When the anchor has been installed in soil so that the top of the sleeve is near the surface, the post may be lifted from the sleeve and replaced without making a new excavation.

U.S. Pat. No. 7,779,588 discloses a concrete foundation which is adapted to be embedded in the ground for supporting a pole thereon. The foundation is comprised of a vertically disposed central section having upper and lower ends with a base section embracing the lower end of the central section and being wedged there against to anchor the central section in the ground. If additional weight is needed, one or more base sections may be stacked on top of the lowermost base section.

U.S. Pat. No. 7,874,126 discloses a service line distribution base including a ground anchor having an upstanding cruciform portion adapted to extend into the ground. A cabinet suited to support a utility pole extends upwardly from the ground anchor. The cabinet defines an internal space for receiving buried wire conduits incorporated into the cruciform ground anchor. The cruciform shape of the ground anchor permits a number of wire conduits to be extended into the base of a utility pole as compared to concrete bases.

U.S. Pat. No. 8,087,846 discloses a bollard configured for storage of a bollard coupling adapted to extend between a bollard and an adjacent structure. Bollards are disclosed that include a body defining an interior body volume and a first aperture. A bracket fixedly attached to the body defines a second aperture. The bracket is configured to reversibly receive a bollard engaging member fixedly attached to an end portion of a bollard coupling. In a first position, at least a portion of the bollard engaging member extends through the first aperture; and in a second position, the portion of the bollard engaging member extends through the second aperture. A cap being releasably secured to the body provides access to the interior body volume and at least partially retains the bollard engaging member. The structure allows bollards to be connected together to create a barrier for pedestrians or vehicles.

U.S. Pat. No. 8,089,747 discloses a power pedestal in the form of a bollard to provide power to a vehicle and to a structure disposed separate from the vehicle. The power pedestal includes a housing having an exterior, a first end fixed to a platform, and a second end disposed opposite and distal from the first end. A meter socket assembly is housed by the housing. At least one first branch circuit breaker and a second main circuit breaker are electrically connected to the meter socket assembly within the housing. At least one of the first branch circuit breakers is electrically connected to the vehicle by a corresponding one of a number of first electrical conductors. The second main circuit breaker is electrically connected to the structure by a second electrical conductor. A meter, which is electrically connected to the meter socket assembly, measures electric energy consumed by the vehicle and the structure.

U.S. Pat. No. 7,952,325 discloses a vehicle charging station that includes a power receptacle compartment that includes a power receptacle to receive an electrical plug. The vehicle charging station also includes a door that is hingedly coupled with the power receptacle compartment to cover the power receptacle when the door is closed. The vehicle charging station includes a first locking means for locking and unlocking the door from a closed position without consuming power to control access to the power receptacle compartment such that the door remains locked in the closed position if the vehicle charging station loses power. The vehicle charging station also includes a second locking means for locking and unlocking the door from a charging position to control access to the electrical plug. The second locking means allows the door to be unlocked from the charging position if the vehicle charging station loses power.

U.S. Pat. No. 8,072,182 discloses a closed-circuit battery charging system for a hybrid vehicle including a below-ground supply of electrical energy; an insulated vertical post extending above-ground and coupled with the below-ground electrical energy supply to provide a source of transmitted electrical power for charging energy storage batteries; a receiver of transmitted electrical power within an insulated coating on the front bumper of the vehicle positioned to inductively couple with the source; and means within the vehicle coupled between the receiver on the vehicle and the batteries thereof to automatically begin charging the batteries when the vehicle is parked with the front bumper in physical contact with the insulated vertical post for electrical inductance coupling to occur between the source of electrical power and the receiver; wherein the source of electrical power is embedded within the vertical post along an external surface thereof, and wherein the receiver is embedded within the insulated coating extending sideways, from side-to-side thereof, horizontally and substantially along the entire length of the front bumper of the automotive vehicle.

U.S. Pat. No. 8,307,967 discloses a mechanical, electrical and telecommunication system to electrically connect a vehicle to an electricity source to transfer energy to the vehicle. In one rendition, the system has a stationary portion on the road or infrastructure side, and a moving member on the vehicle. The system is designed to tolerate misalignments of a parked vehicle with respect to the parking stall. The infrastructure or roadside component of the system being mechanically static is designed rugged. An important component of the system is a pair of rigid, insulating strips with a series of conductors on each of them, placed at approximately right angles to each other. One of the strips is mounted on the infrastructure or roadside and the other on the vehicle. The two strips cover the lateral and longitudinal misalignment of the parked vehicle. As long as the two strips have an overlap, the connection can be made by the conductors in the overlap region. The system is designed to operate only in the active presence and active desire of a vehicle to connect to the infrastructure or roadside stationary part.

U.S. Pat. No. 8,299,754 discloses a portable charging system detachably drawing from a power source. The device can be connected to a residential power source for charging and thereafter disconnected from the residential power source for transport to an EV for charging of its batteries.

U.S. Pat. No. 7,248,018 discloses a personal refueling station for a personal-sized electric vehicle. The device has a polygonal base structure housing a refueling system and a plurality of flat panels hinged thereto which open to form a flat surface and close up to an upright pyramid for storage. The flat panels have solar PV arrays mounted on their inside surfaces which generate electricity from sunlight in the open position. The electricity is used to generate hydrogen for hydrogen-fuel-cell vehicles, or is stored for recharging non-hydrogen electric vehicles. Alternatively, hydrogen or electricity may be provided from an external renewable power source.

U.S. Pat. No. 8,111,043 discloses an EV charger in combination with a streetlight. Streetlights positioned along streets and in parking lots are often suitably located for a vehicle to park in immediate proximity. An electric vehicle charging system and method allows the power supply previously dedicated to the streetlight to be used for electric vehicle recharging whenever the streetlight is not lit. In some embodiments, if the total of the current drawn by the electric vehicle charging and the lit streetlight is less than the rating of the streetlight power supply, then charging may continue even while the streetlight is lit. Further, if an electric vehicle so charging offers a utility-interactive inverter, then upon demand the electric vehicle may be available to supply power back to the electric grid.

U.S. Pat. No. 8,022,667 attempts to meet EV recharging infrastructure needs using a method and system for connecting a vehicle to a parking meter charging source. The parking meter charging source includes a retractable protrusion for the electrical connection of a vehicle to a charging source (i.e., a battery). While the parking meter charging source can provide energy to an EV, it is neither adaptable nor expandable. Further, the parking meter charging source is used as a standalone unit, which is incapable of providing structural support to anything more than a meter device and a single solar panel.

U.S. Pat. No. 5,847,537 also attempts to meet EV recharging infrastructure needs. The patent discloses a charging station system of electric vehicles having a building which contains the charging equipment and may provide other auxiliary services. Nevertheless, while the building is modular and expandable, it is not capable of adaptation for differing needs.

U.S. Pat. No. 5,847,537 discloses a charging station system for electric vehicles having a building which contains the charging equipment and may provide other auxiliary services. The system includes a T-bar which extends from the building to provide charging stalls or locations spaced along the T-bar. The building is modular and incorporates a standard ISO type configuration for ease and convenience of installation and transportation.

U.S. Pat. No. 8,013,569 discloses a renewable energy system for directly charging electric and hybrid vehicles for areas with modest wind resources and/or solar resources. The invention consists of a composite stanchion for mounting on a base in a parking lot that is both capable of supporting a medium sized wind turbine (or solar array) and serving as a battery storage and charging control station. Significant improvements in blade pitch adjustment and cost reduction for wind turbine blades allow the system to operate at an acceptable cost in areas with modest winds and avoid the need for remotely supplied renewable electricity in areas of high population density.

It remains that a need exists to provide useful EV infrastructure that is adaptable and customizable to meet any number of functional and structural requirements for community-scale use. The invention disclosed herein provides a device and method to determine the benefits of and need for EV infrastructure on any scale and/or quantity. Further, the invention provides physical EV infrastructure, which can stand alone or be further adapted to support an expansion feature or any combination of expansion features above it. For example, the invention can be configured to harness energy (which can be fed into an electric utility power grid), to provide shelter, to provide security and/or to provide structural support for physical structures such as buildings. The flexible nature of the invention permits adaptable integration into existing transportation infrastructure.

SUMMARY

The EV infrastructure of the present invention comprises: a customizable charging station comprised of at least one modular bollard having a form that is mountable upon a footing at one or more bollard attachment points upon a bollard attachment plate, and at least one expansion attachment element fashioned on a bollard expansion plate; electrical vehicle supply equipment sealably integrated with or connected to the modular bollard; and a foundation.

The customizable charging station can be fashioned with a structural trunk having at least a first end, a second end, and at least one sidewall extending a length between the first end and the second end. The first end is securable upon the at least one expansion attachment element fashioned on the bollard expansion plate and the second end can fixedly engage with a functional unit such as a canopy, a security lamp, a surveillance camera, and/or a beam or joist.

In another aspect of the invention, a customizable charging station can be assembled on-site by identifying a point of utility interconnection; trenching to interconnection point; forming a foundation; and fastening a modular bollard upon the foundation.

Yet another aspect of the invention includes a method for planning EV infrastructure based upon forecasted impacts upon holistic (or social), environmental, and financial factors. These factors can be calculated by inputting research data (which may include publically available figures); analyzing and calculating the research data to determine the most economically, environmentally and socially effective manner of installing a renewable energy powered charging infrastructure; followed by outputting holistic cost and benefit values, environmental cost and benefit values, and financial cost and benefit values, wherein the benefits are determined by a comparative analysis to fossil fuel transportation derived figures.

The inputs may include any number of metrics. For example, the research data may be comprised of electric vehicle market development, renewable and non-renewable energy, vehicles, financial forecasts, sales projections, tax codes and incentives, budgets, demographics, product lifecycles, greenhouse gas emissions, and/or ground-level air pollution.

Regarding the outputted figures, holistic economic costs and benefits may include the volume of fossil fuels saved by geographical area or community; the savings retained by a geographical area or community; and jobs created by geographical area or community. The environmental costs and benefits comprise carbon emission reduction values, and illustrational comparisons. The financial costs and benefits comprise electric vehicle charger and renewable energy capacity required to meet fueling demand; renewable energy credit revenue; forecasted charging revenue; a tax depreciation schedule; a vehicle depreciation schedule; a maintenance schedule, return on investment; and/or regional economic development and job growth.

Therefore it is an objective of the present invention to provide an EV infrastructure charging station which overcomes the deficiencies known in the art.

It is another objective of the present invention to provide a bollard that can be used as a standalone unit providing electrical vehicle supply equipment protection and user-friendly consumer/charger interaction.

It is a further objective of the present invention to provide a bollard assembly that can be configured in numerous ways to become an integral part of new or existing structures.

It is yet another objective of the present invention to provide an EV charging bollard in combination with an EV structure suitable for delivering renewable energy from the sun to the power grid whenever the sun is shining.

It is still yet another objective of the present invention to provide a bollard assembly constructed and arranged to draw energy from the grid and through an integrated canopy solar array, whereby electric vehicles can be charged during the day or night, rain or shine.

An even further objective of the present invention is to provide a bollard assembly constructed and arranged to form a structural portion of a canopy type solar array whereby power generated from the solar array may be utilized for charging or delivered to an electrical grid.

Still yet a further objective of the present invention is to provide a method of planning EV infrastructure which can demonstrate the benefits of and need for EV infrastructure on any scale. Thus, community decision makers can make informed decisions regarding the scale of EV infrastructure that needs to be adopted and installed. For example, a community decision maker can use the invention to justify the costs associated with EV infrastructure investment. Furthermore, the EV infrastructure is adaptable and expandable and can, therefore, be altered to meet the ever changing needs of any community.

The EV infrastructure described herein provides the added benefit that it is adaptable and expandable to meet the ever changing needs of any community, including the varied needs per geographically, socially, and economically distinct communities.

DETAILED DESCRIPTION OF THE PREFERRED EMBODIMENTS

For purposes of the description hereinafter, spatial orientation terms, if used, shall relate to the referenced embodiment as it is oriented in the accompanying drawing figures or otherwise described in the following detailed description. However, it is to be understood that the embodiments described hereinafter may assume many alternative variations and embodiments. It is also to be understood that the specific features illustrated in the accompanying drawing figures and described herein are simply exemplary and should not be considered as limiting.

Figure 1:
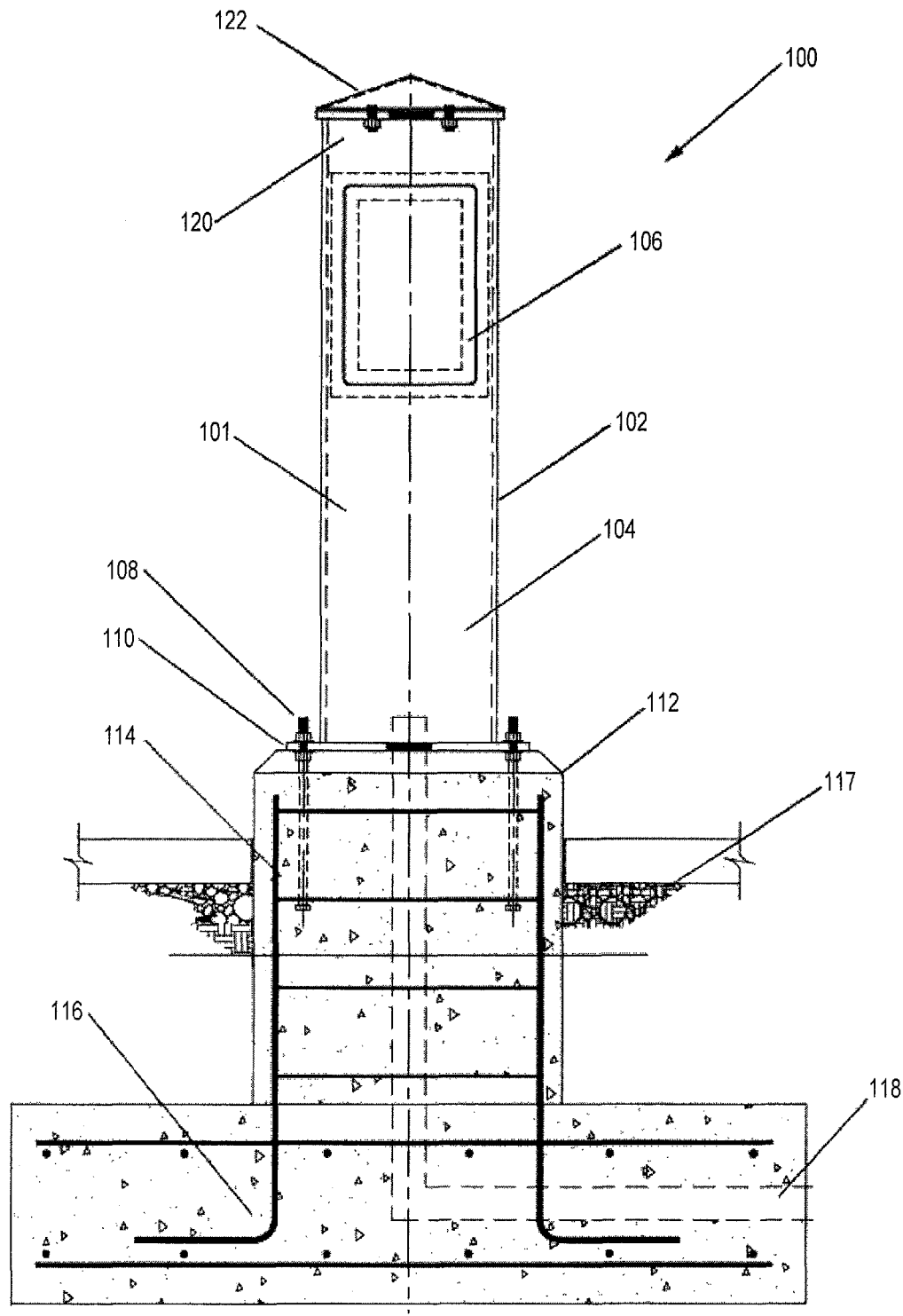
FIG. 1 is a longitudinal front cross-sectional view of a modular bollard system for charging electric vehicles in combination with a concrete foundation.
Figure 2:
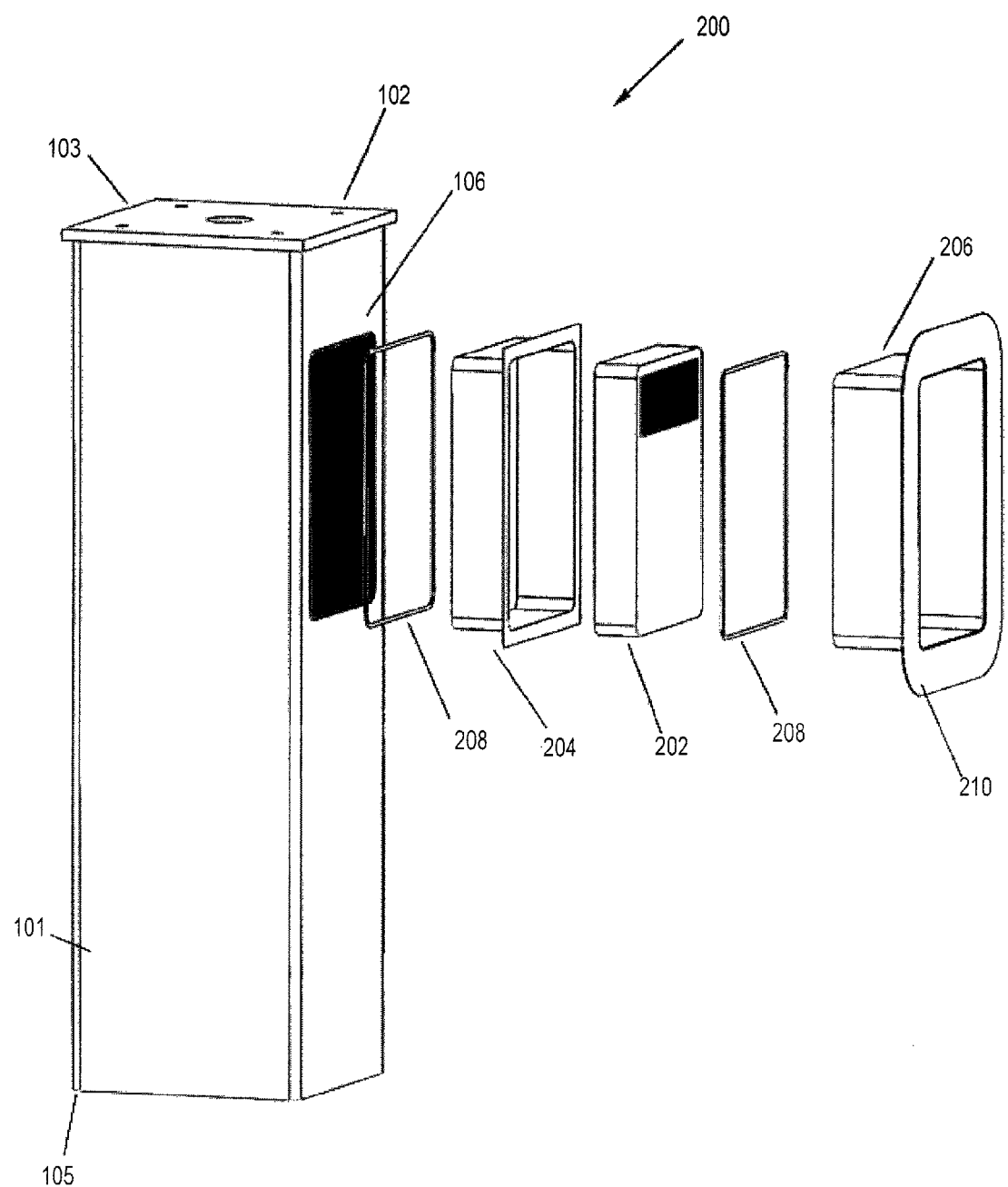
FIG. 2 is a partial perspective exploded view of the modular bollard system and electrical vehicle supply equipment.
Figure 3:
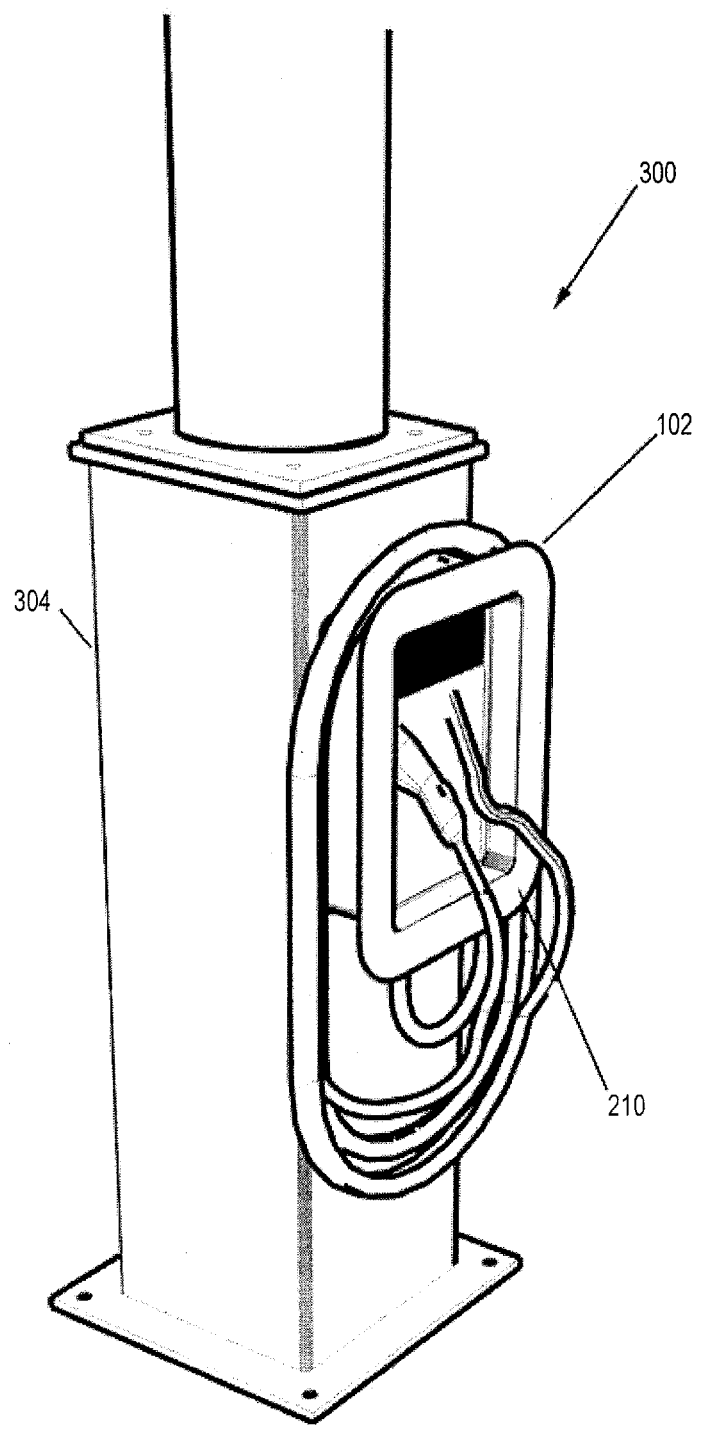
FIG. 3 is a partial perspective view of the modular bollard system in combination with a trunk member.

Referring to FIGS. 1-3, a modular bollard system 100 for charging electric vehicles is illustrated. In this non-limiting embodiment, the modular bollard system depicted in FIG. 1 includes a modular bollard assembly 102, which may be a standalone unit preferentially prefabricated using any suitable material which may include, but should not be limited to, steel, aluminum, reinforced plastic, fiberglass, zinc or suitable combinations thereof for delivery to an EV infrastructure installation site, such as a municipal parking lot or the like. In general, the modular bollard system is constructed and arranged to receive electrical vehicle supply equipment 202 that further connects to pre-determined Electric Vehicle Supply Equipment (EVSE) while acting as a structural member of an overhead structure. To accomplish both tasks, the modular bollard assembly 102 includes a tubular central portion 101 having a hollow cavity 104, a first end portion 103 and a second end portion 105. The tubular central portion may be made to any tubular shape which may include polygons, cylinders, ovals, or suitable combinations thereof when viewed from the end, and includes a length which suits the expandable EV infrastructure or building. At the first end 103, the tubular central portion 101 includes a first expansion plate 120 fashioned with a hole or bolt pattern 107 (FIG. 7B) to match various expansion caps 109, 111, 113, discussed below. In situations where the bollard 102 is installed as standalone EV infrastructure, the expansion plate 120 can be optionally fit with a matching expansion cap 109, 111, 113 until an adaptation/expansion need arises allowing the expansion cap to interchanged for a different cap. The expansion caps may be pointed 109 to prevent birds or debris from settling on the top surface of the bollard, flat 111 or an extended structural trunk member 113 for support of an overhead structure. Fasteners 115 are the preferred means of securing the expansion caps to the first expansion plate 120. In this manner, the expansion caps are easily changed from one to another to allow greater versatility to the modular bollard assembly. The tubular central portion includes a hollow cavity 104 and a prefabricated receiving port 106 which provides access to the hollow cavity.

At the base, the modular bollard assembly 102 may be anchored to the ground or asphalt 117 by attachment to a footing 112 at the one or more attachment points 108 located upon a second attachment plate 110 secured to the second end of the tubular member 101. The footing may be formed of reinforced concrete and may include a number of anchor means 114, such as bolts, arranged in a pattern to equally match the one or more bollard attachment points 108. The footing 112 can be reinforced by encasement of a reinforcing structure such as a rebar footing cage 116, which may be prefabricated as a singular element and optionally includes added features such as the anchor means 114. Further, the footing 112 can be formed about at least one internal conduit 118 to connect the bollard 102 to an electric utility grid.

Referring to FIGS. 2 and 3, the prefabricated receiving port 106 of modular bollard 102 is fashioned to receive electrical vehicle supply equipment 202 that further connects to pre-determined EVSE. The electrical vehicle supply equipment 202 is sealably integrated with the modular bollard 102 (e.g., bollard 102). The electrical vehicle supply equipment 202 may be selected from commercially available chargers, such as chargers manufactured by Coulomb Technologies, Inc.

Still referring to FIGS. 2 and 3, the electrical vehicle supply equipment 202 is assembled with a housing 204 and a bezel 206, each of which may be prefabricated with a suitable material (e.g., steel or molded plastic) and sealed with a gasket 208 therebetween. The bezel 206 attaches flush to the face of the housing 204, when flush mounted in the receiving port 106. Further, bezel 206 may be fashioned to accommodate various EVSE. For instance, as shown in FIG. 3, bezel 206 has a flange 210 that forms a channel for wrapping an EVSE cord when connected to the bollard 102. Alternatively, the EVSE may have a waterproof membrane and gutters, and does not have to contain a seal or bezel. Any EVSE can be surface mounted. FIG. 3 also shows a service door panel 304, which provides access to the hollow cavity of bollard 102 and wiring therein from at least one internal conduit 118.

Figure 4:
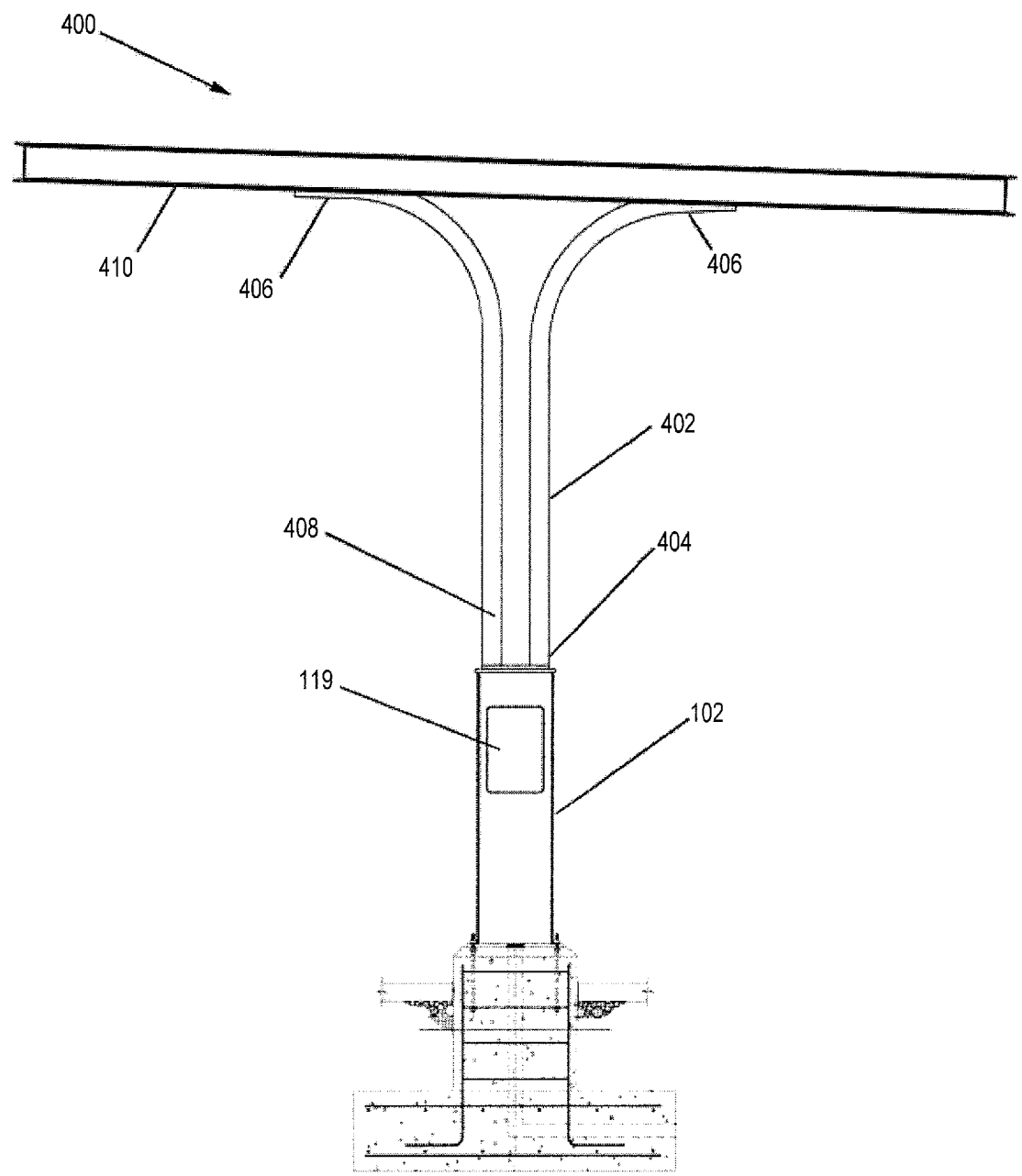
FIG. 4 is a front view partially in section illustrating a modular bollard and footing attached to a trunk and canopy.

Referring to FIG. 4, the modular bollard assembly is illustrated in combination with an overhead structure 400. The modular bollard assembly 102 is fashioned with a structural trunk 402 comprising a first end 404, a second end 406, and at least one sidewall 408 extending a length between the first end and the second end. The second end 406 has at least one attachment point for a functional unit, such as a canopy 410. The canopy 410 is expandable and adaptable and can extend the full length of the EV overhead structure 400. Thus, it is connectable to any number of modular bollards 102, as further described below. The canopy 410 can be installed in a predetermined orientation that can, for example, maximize the amount of protection offered to any EV engaged with the EV infrastructure 400. The canopy 410 can therefore serve as a roof system that helps keep an EV charging environment free of the elements such as precipitation, standing water and/or sunlight. Additionally, the modular bollard 102 may include a service entrance 119, which may be mounted upon an exterior surface of modular bollard 102 or located elsewhere on the EV infrastructure installation site. The service entrance 119 provides a point of electric utility grid interconnection, and may be selected from commercially available units, such as a combination meter/breaker box. The service entrance can provide access to infrastructure related components, including but not limited to communications hardware, wiring, switches and controls.

Figure 5:
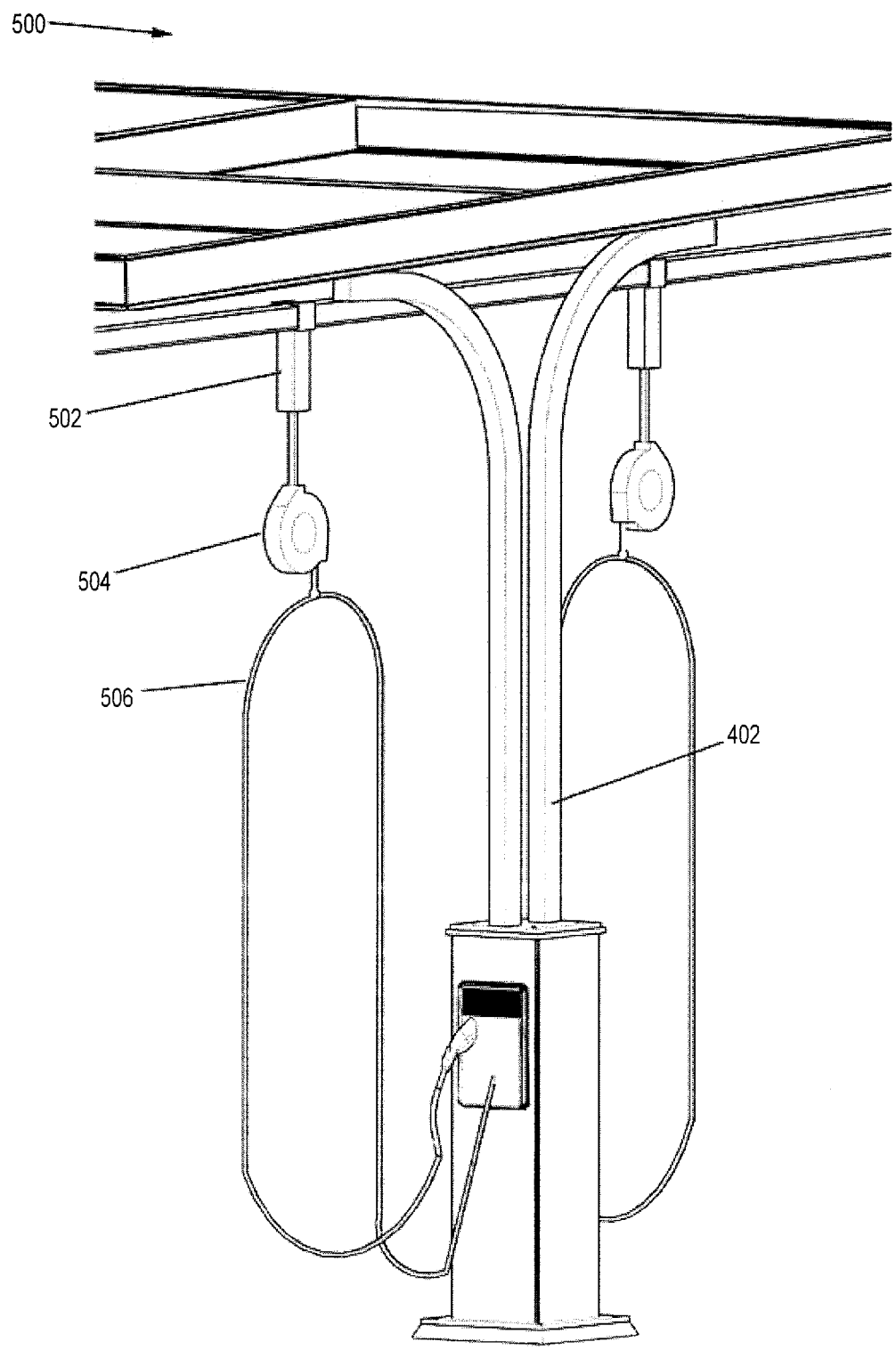
FIG. 5 is a perspective view of a modular bollard and electrical vehicle supply equipment attached to a trunk and canopy.

Further, as shown in FIG. 5, the structural trunk 402 can also be fitted with various EVSE. For example, in EV infrastructure 500, the structural trunk 402 is fitted with an EVSE mounting bracket 502 that can be fixedly engaged with EVSE, such as a retractable lanyard 504 for charging cord 506 management. In one-nonlimiting embodiment of the invention, the mounting bracket 502 can be slidably engaged with the structural trunk 402 such that the retractable lanyard 504 can be repositioned to accommodate various positions of a charging EV.

Figure 6:
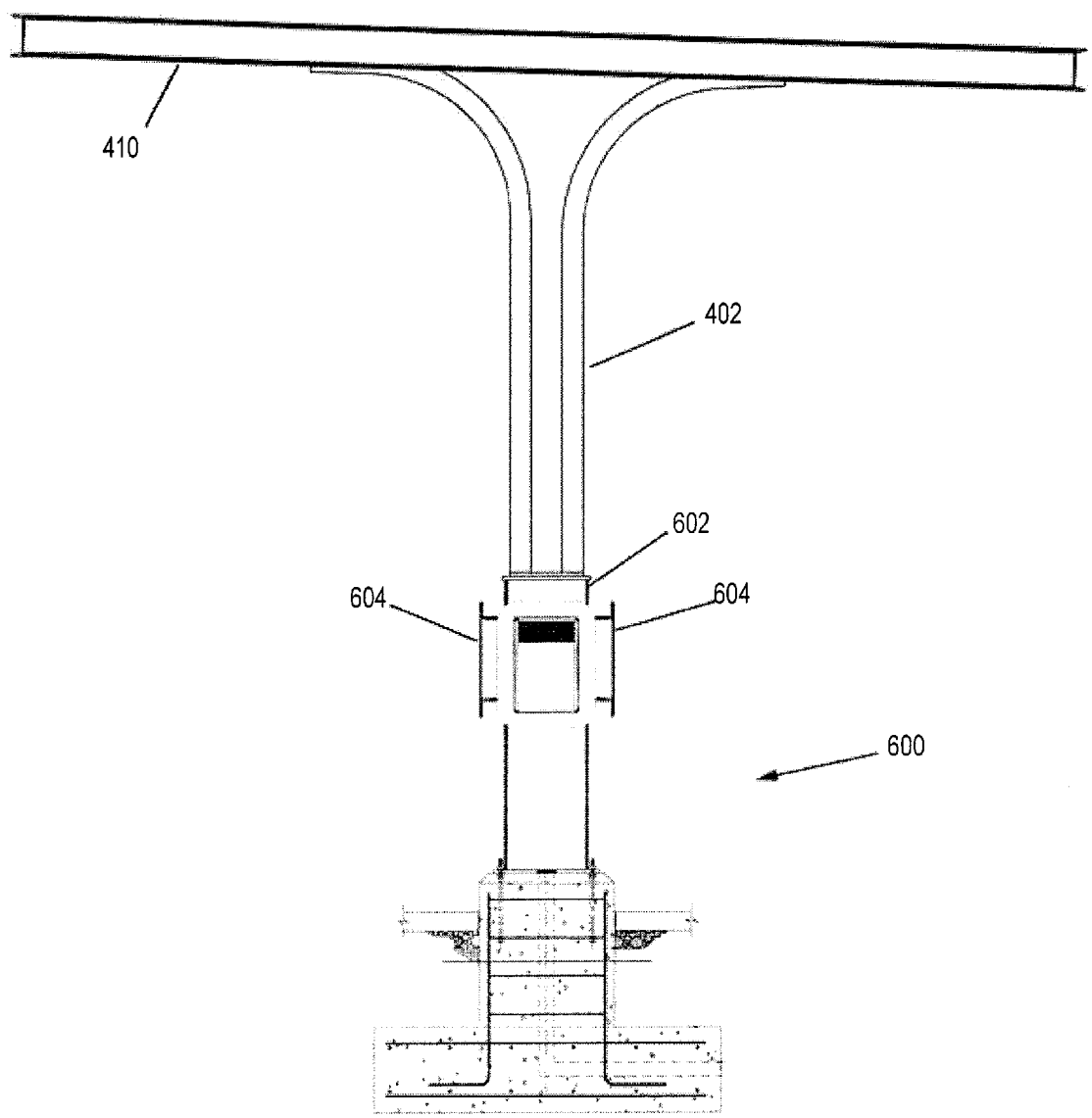
FIG. 6 is a front view of an alternative embodiment of a modular bollard and footing attached to a trunk and canopy.
Figure 7A:
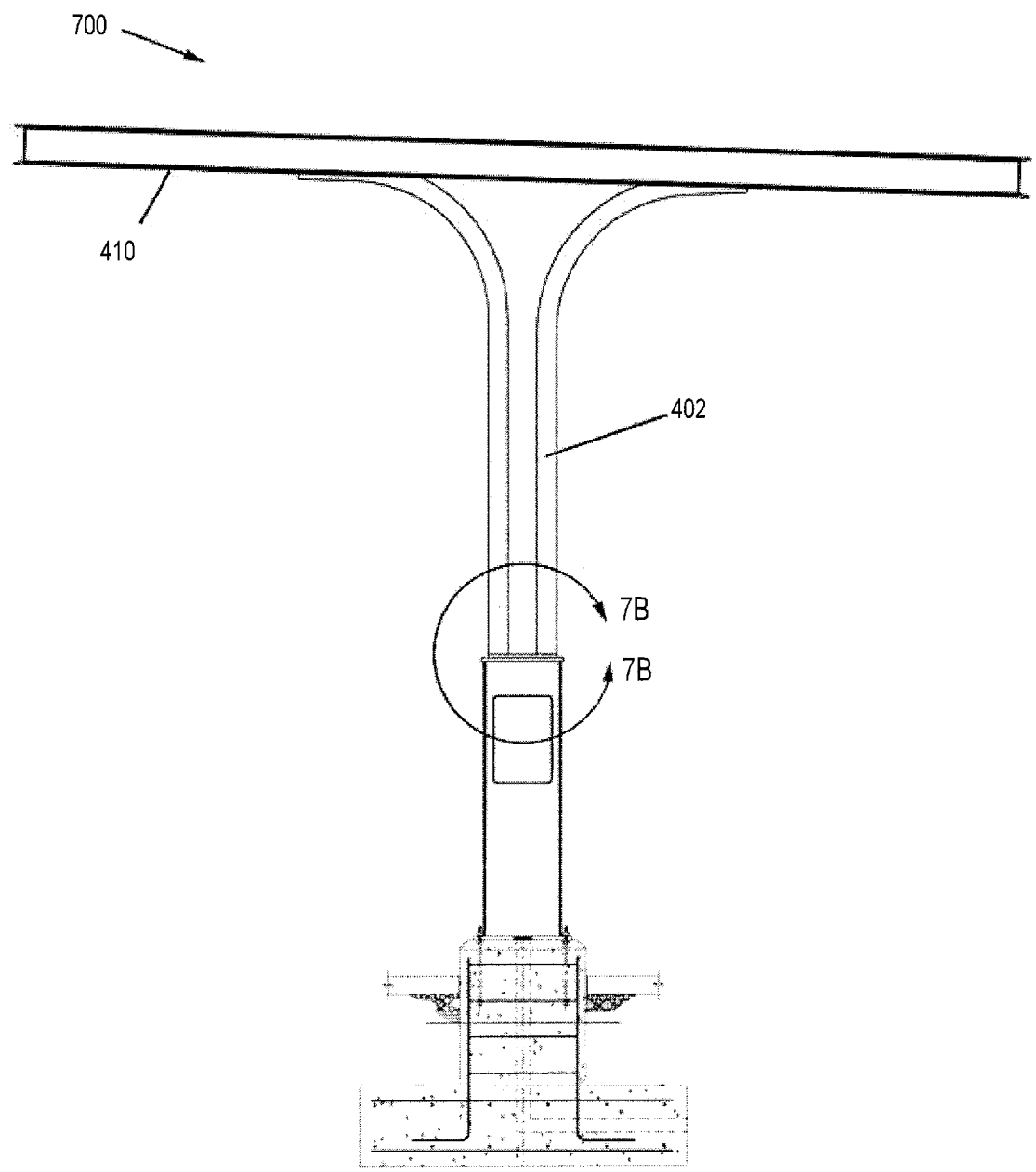
FIG. 7A is a side view of an alternative embodiment of a modular bollard and footing attached to a trunk and canopy.
Figure 7B:
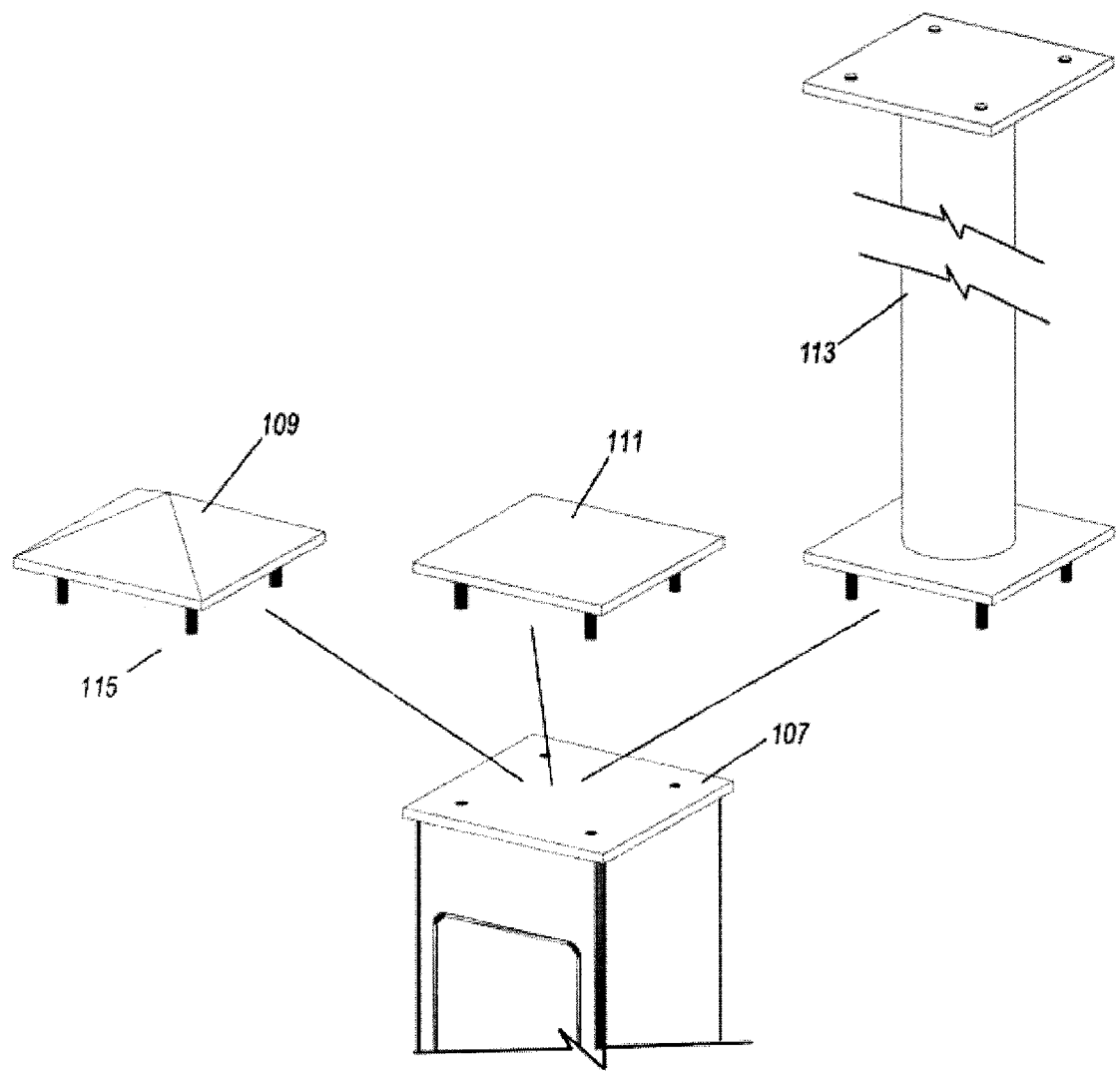
FIG. 7B is a partial perspective view taken along lines 7B-7B of FIG. 7A illustrating various components that may be secured to the top surface of the modular bollard.

FIG. 6 and FIG. 7A show variations of the structural trunk 402 and orientation of the canopy 410. In one-nonlimiting embodiment of the invention, the EV infrastructure may include a meter/breaker box 602 and between 1 and 3 electrical vehicle supply units 604, which are flush mounted upon a modular bollard (e.g., bollard 102). Further, the canopy 410 can be oriented in a direction (e.g., North-South) and at predetermined fixed tilt angle (e.g., 15° relative to the horizon) to optimize average solar exposure at any latitude and/or provide protection to an EV underneath.

Figure 8:
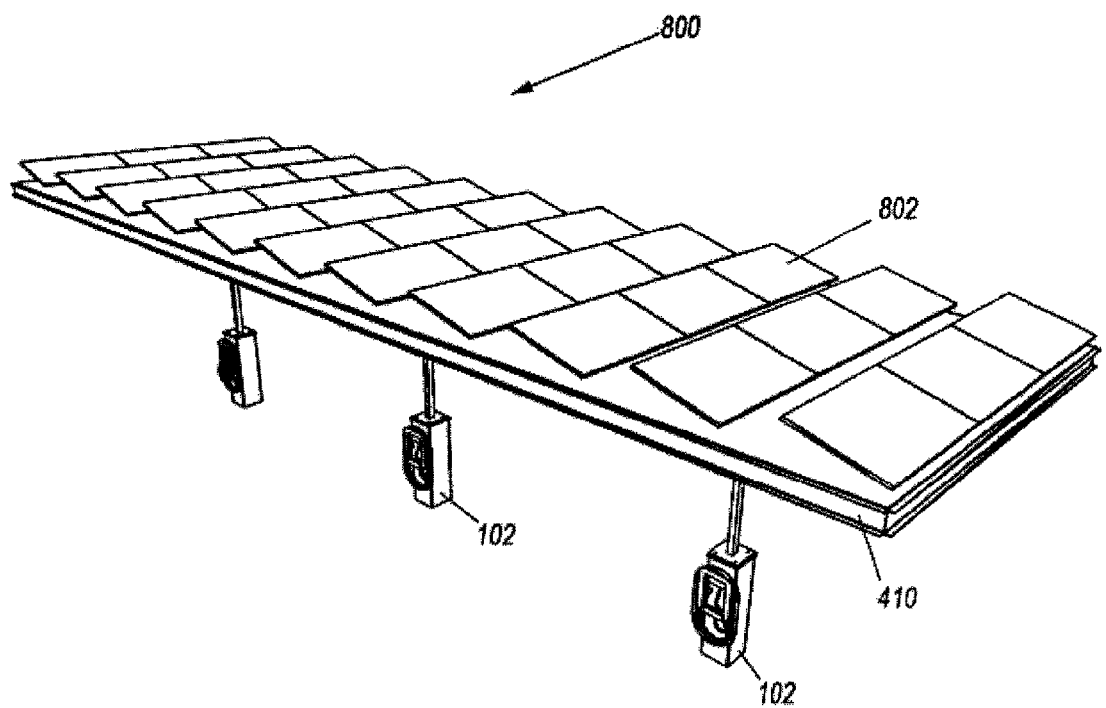
FIG. 8 is a perspective view of multiple modular bollards supporting a roof structure.
Figure 9:
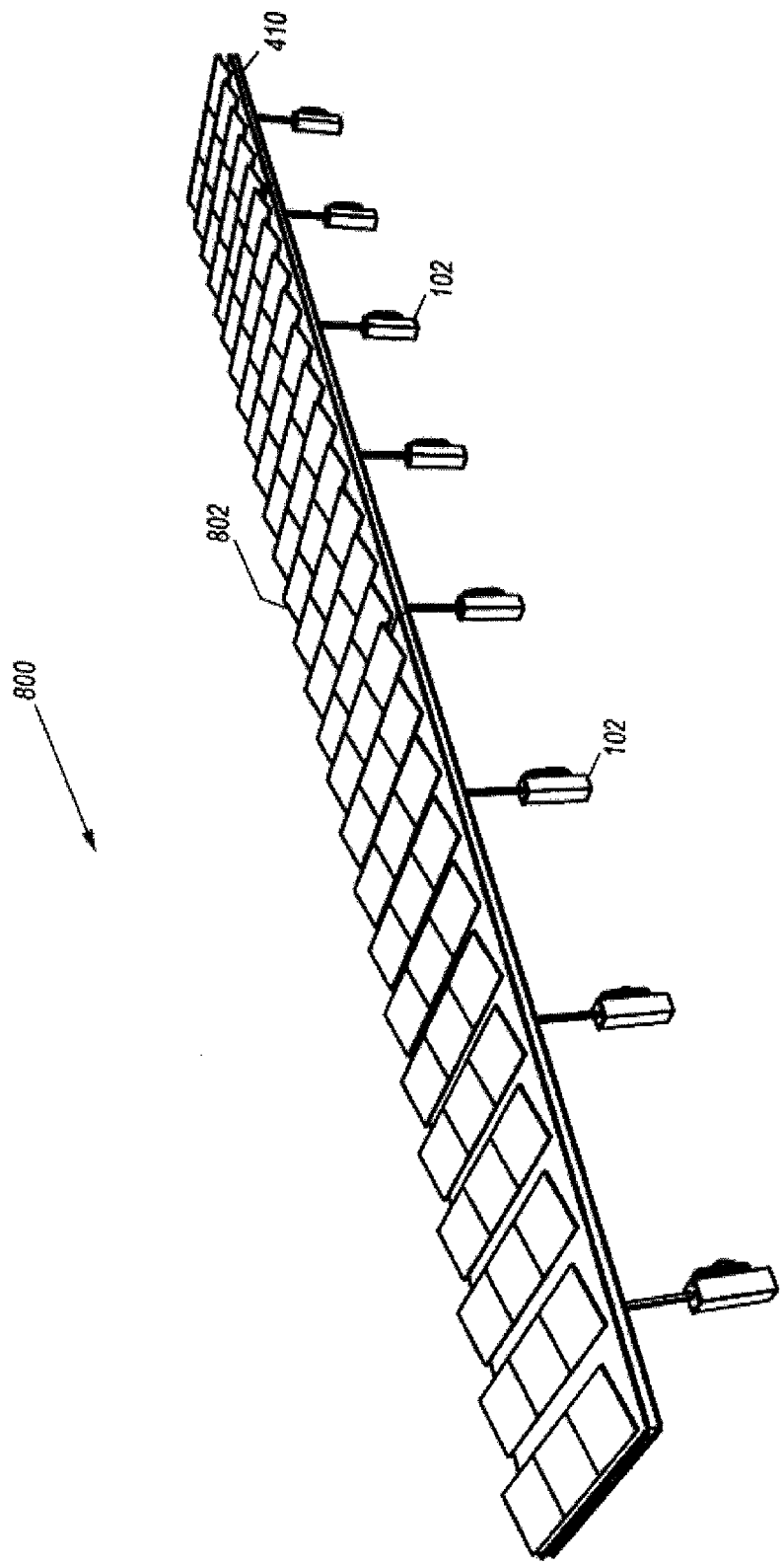
FIG. 9 is a perspective view of multiple modular bollards supporting a roof structure.
Figure 10:
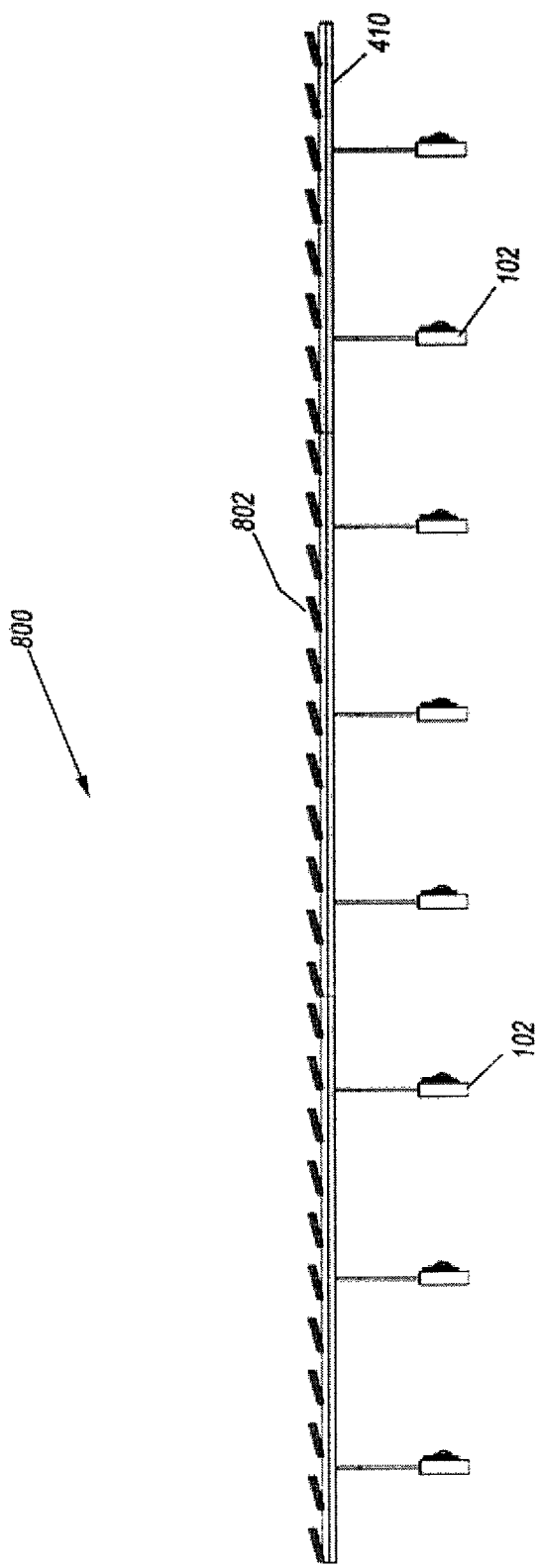
FIG. 10 is a front view of the embodiment illustrated in FIG. 9.

Referring to FIGS. 8-10, the number of modular bollards 102 can be adjusted according to EVSE infrastructure requirements. For example, additional bollards may be added to an EV infrastructure 800, each bollard 102 may accommodate 1-3 additional electrical vehicle supply units (e.g., electrical vehicle supply equipment 202) and a functional unit, such as a canopy 410.

Still referring to FIGS. 8-10, the canopy 410 may also be fashioned with solar panels 802 that provide electrical energy back into an electrical utility grid by means of a service entrance (e.g. the combination meter/breaker box, mentioned above). Thus, even where a functional unit comprises a renewable energy collection device such as solar panels 802, the EV infrastructure of the present invention remains dependent upon an electric utility grid. The solar panels 802 may be mounted from 0-90° relative to the canopy 410 to provide an average optimal solar collection position determined by the installation latitude.

Figure 11:
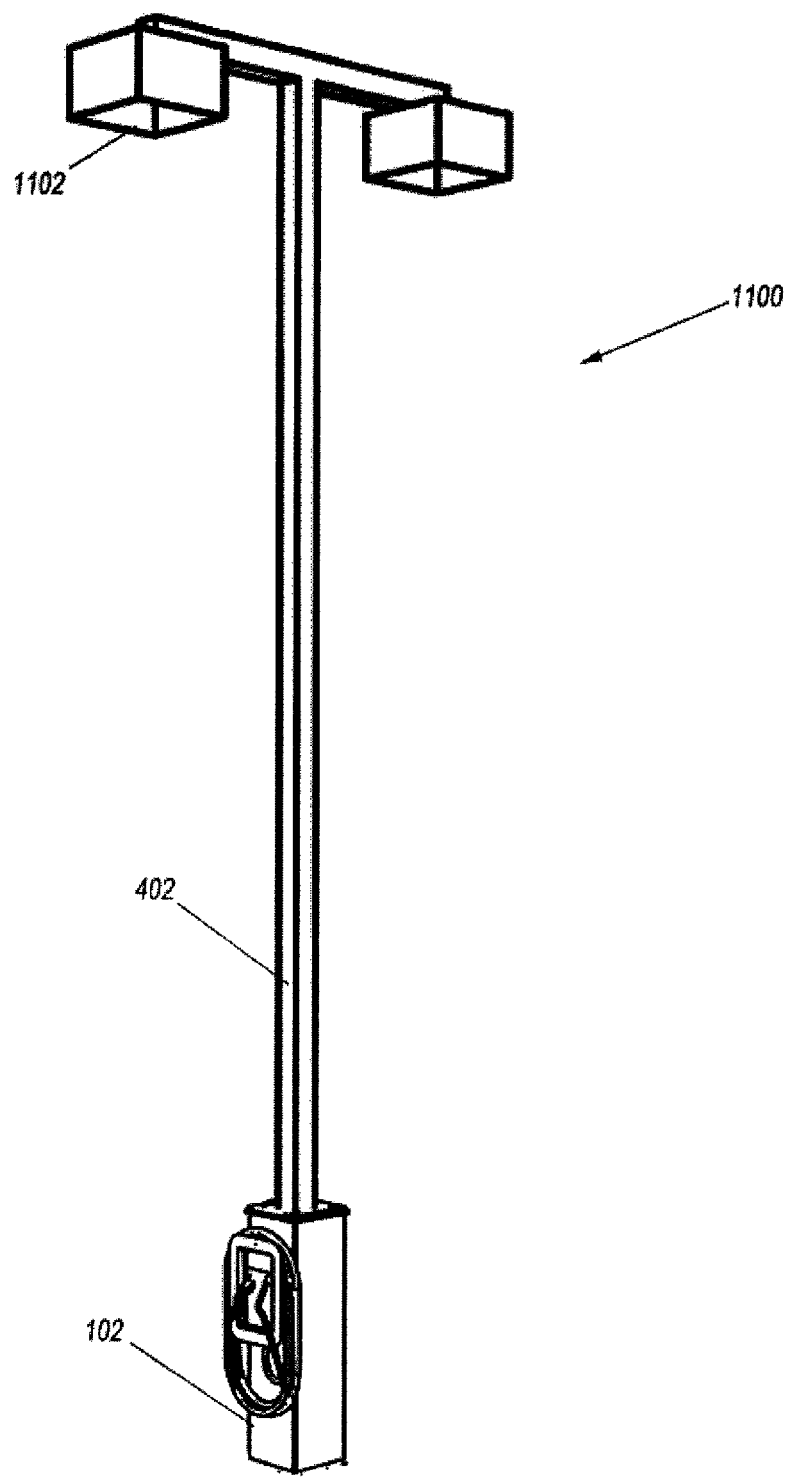
FIG. 11 is a perspective view of the modular bollard in combination with a light pole.

With respect to FIG. 11, modular bollard assembly 102 can provide support for any suitable attachment. For example, EV infrastructure 1100 may be fashioned with a lighting attachment 1102 fixedly mounted upon the structural trunk 402.

Figure 12A:
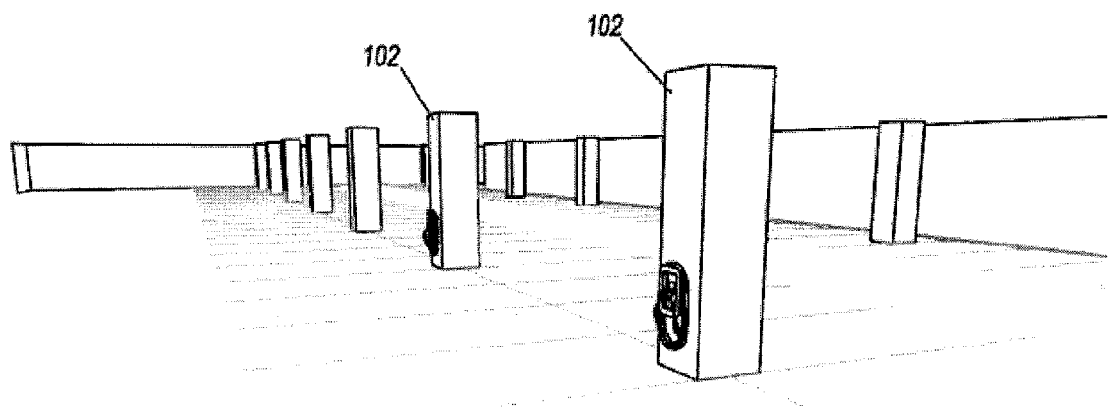
FIG. 12A is an alternative embodiment of the modular bollard illustrated directly supporting a roof structure.
Figure 12B:
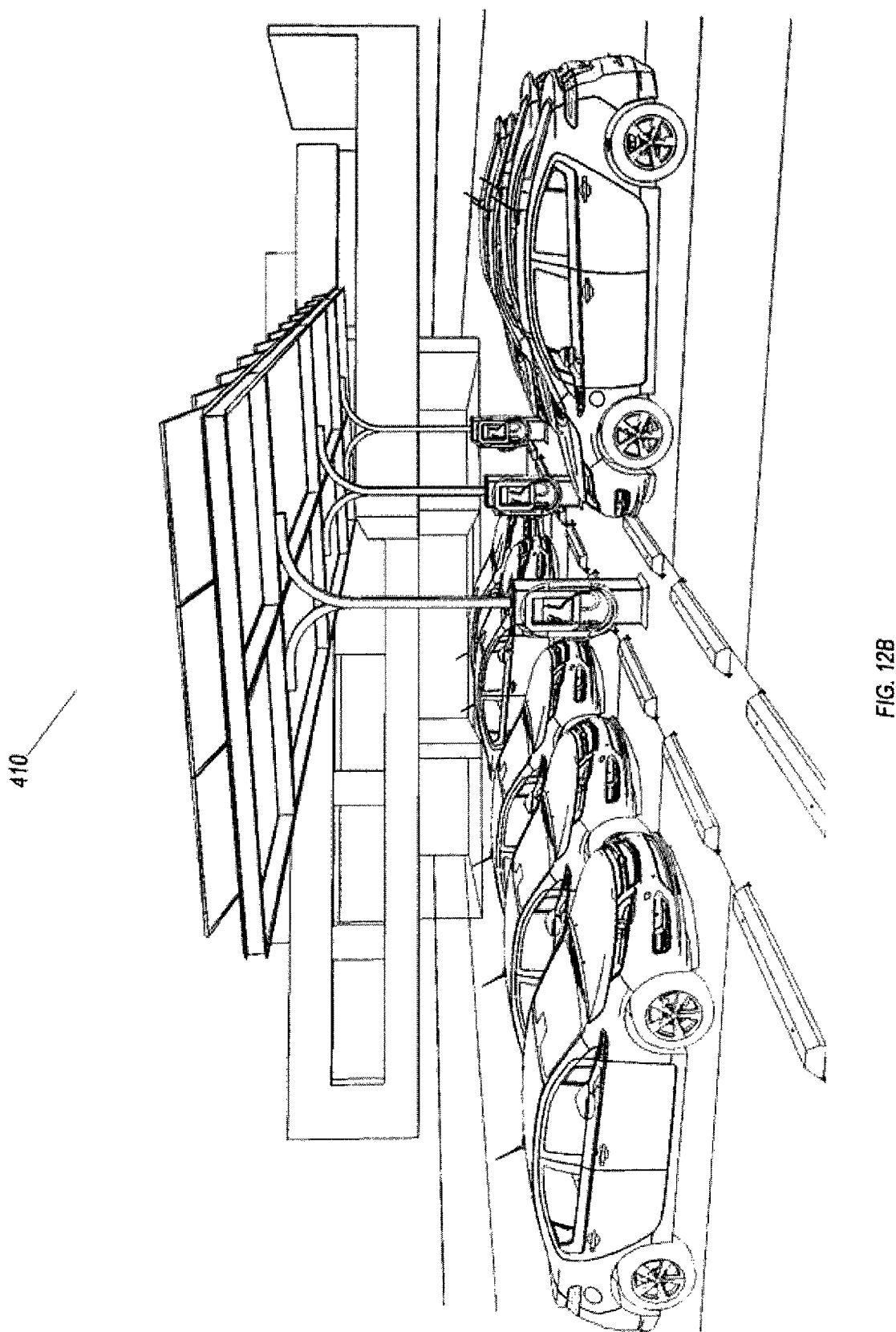
FIG. 12B is an alternative embodiment of the modular bollard illustrated directly supporting a canopy.
Figure 12C:
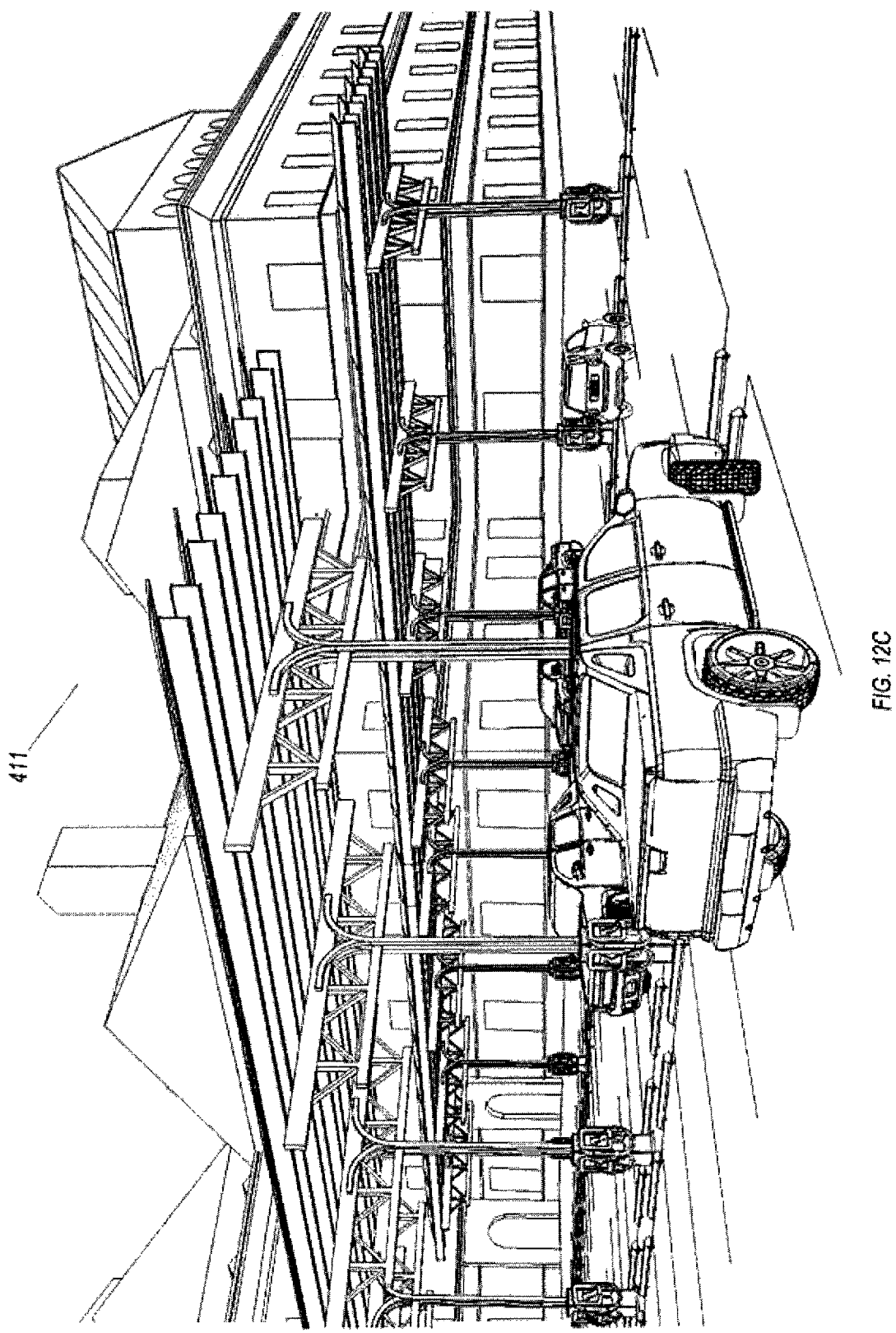
FIG. 12C is an alternative embodiment of the modular bollard illustrated directly supporting an alternative overhead structure.
Figure 12D:
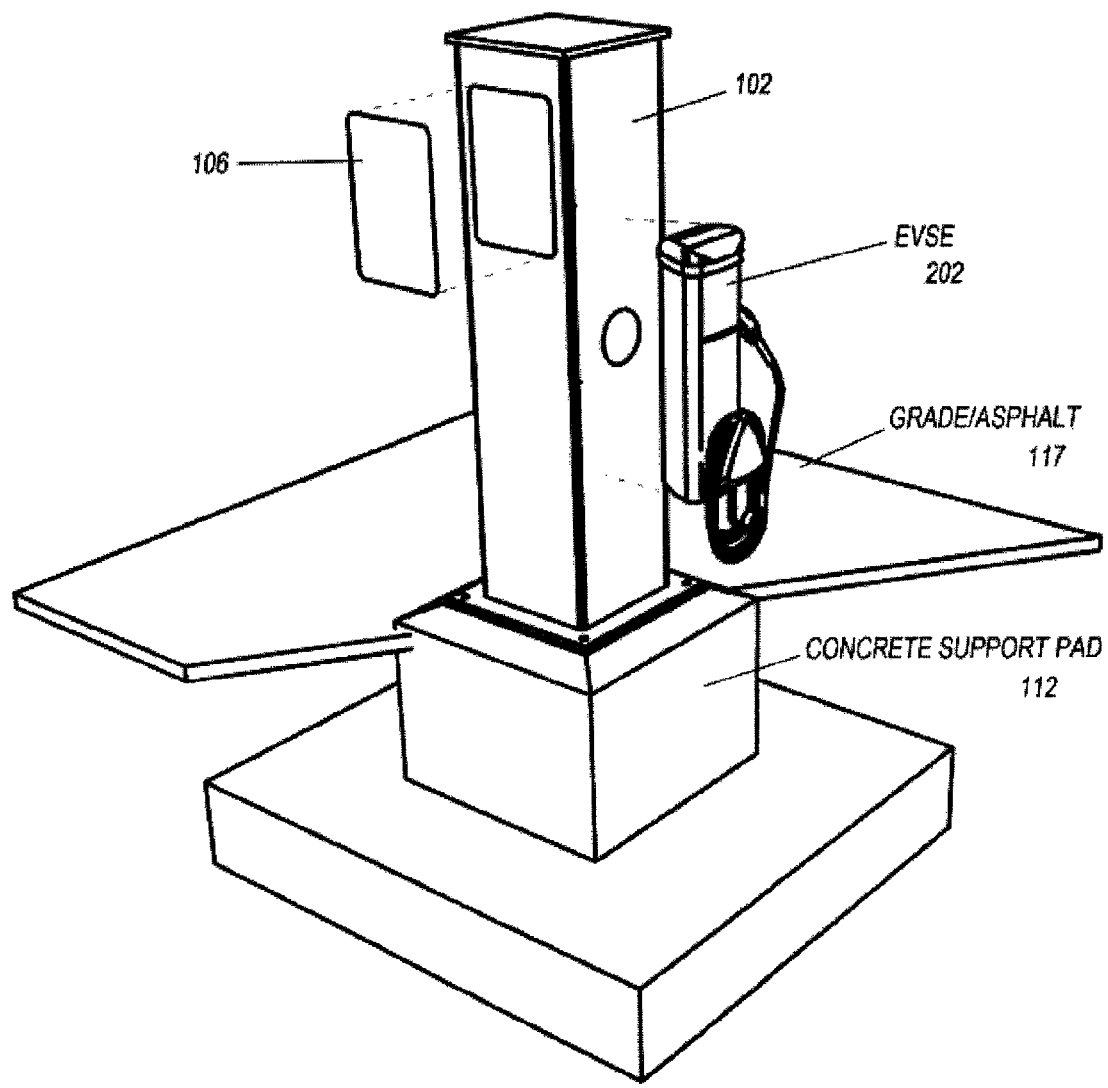
FIG. 12D is a perspective view of the modular bollard illustrated in Figures B and C.

The modular bollard 102 may be fabricated to any height, but is preferably between 4 feet and 12 feet tall. Further, the bollard 102 is capability of bearing loads up or exceeding 600,000 pounds. Nevertheless, the bollard 102 load specifications are predetermined to an EV infrastructure arrangement by composition of materials and overall shape/size of the bollard 102. In another non-limiting embodiment of the invention, such as the EV infrastructure of FIG. 12A, one or more of the bollards 102 may be used to provide support for attachments and/or support for a structure such as a dwelling or a parking deck. Alternatively, the bollards 102 may be used to provide support for other structures such as a canopy 410 or alternative overhead structures 411 located in an outside parking lot associated with a building, see FIG. 12B or 12C. Referring to FIG. 12D, a perspective view of the bollards 102, illustrated in FIGS. 12B and 12C is shown with a footing illustrated as a concrete support pad 112 supporting the bollard above the asphalt surface 113.

Yet another non-limiting embodiment of the invention includes a method for planning EV infrastructure based upon a comparative analysis of vehicle clusters. Vehicle clusters may include representative sample(s) of EVs as well as representative sample(s) of vehicles that may be replaced by EV implementation (i.e., conventional internal combustion vehicles).

A vehicle cluster for replaceable vehicles can be determined using the following criteria: 1) sample size; 2) the composition of the sample (e.g., vehicle model(s)); 3) fuel economy; 4) maintenance costs; 5) distance traveled; 6) fuel cost; 7) emissions; 8) fuel consumption; 9) infrastructure maintenance costs; and 10) income derived from the sale of petroleum-derived fuels. On the other hand, a comparison vehicle cluster for replacement vehicles (EVs) can be determined using the following criteria: 1) sample size; 2) the composition of the sample (e.g., vehicle model(s)); 3) fuel economy; 4) maintenance savings; 5) distance traveled; 6) fuel savings; 7) emissions; 8) power consumption; 9) power costs; 10) economic retention; 11) EV infrastructure costs; 12A) return on EV infrastructure investment; 13) consumer petroleum-derived fuels savings; and 14) jobs creation.

The calculations herein may be undertaken as part of a software program that is capable of execution upon a personal computer, mobile device, or a network server. Further, the comparative analysis may be used for cloud computing client services. In any case, the program may be used as a client consulting tool and/or provided to a customer on a pay per use or subscription based basis.

Figure 13:
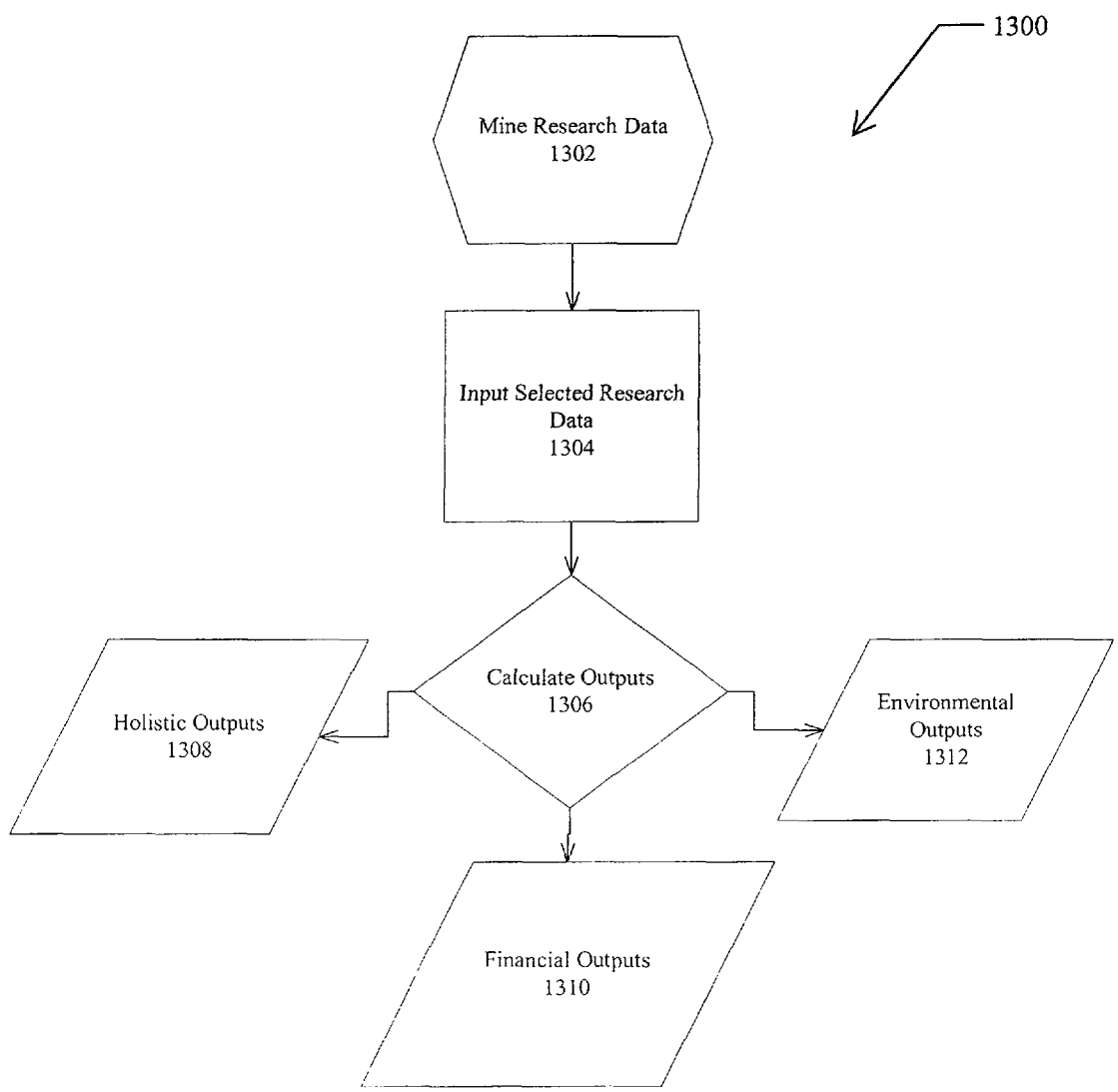
FIG. 13 is a flowchart of a method for planning electric vehicle infrastructure.

The aforementioned vehicle cluster data can be used to forecast impacts upon various holistic (or social), environmental, and financial factors. As shown in the method for planning EV infrastructure 1300 of FIG. 13, these factors can be calculated by mining research data 1302, which may be derived from known databases; inputting research data 1304; and analyzing the research data to calculate outputs 1306 that represent the most economically, environmentally and socially effective manner of installing a renewable energy-powered charging infrastructure. The calculated outputs 1306 can be represented as holistic outputs 1308, financial outputs 1310, and/or environmental outputs 1312, wherein all outputs can comprise cost and benefit values by a comparative analysis to fossil fuel transportation derived figures.

The inputs may include any number of metrics. For example, the mined research data 1302 may be comprised of electric vehicle market development, renewable and non-renewable energy, vehicles, financial forecasts, sales projections, tax codes and incentives, budgets, demographics, product life-cycles, greenhouse gas emissions, and/or ground-level air pollution.

Regarding the holistic outputs 1308, financial outputs 1310, and/or environmental outputs 1312, holistic costs and benefits may include the volume of fossil fuels saved by geographical area or community; the savings retained by a geographical area or community; and jobs created by geographical area or community. The environmental costs and benefits comprise carbon emission reduction values and/or energy consumption. The financial costs and benefits comprise electric vehicle charger and renewable energy capacity required to meet fueling demand; renewable energy credit revenue; forecasted charging revenue; a tax depreciation schedule; a vehicle depreciation schedule; a maintenance schedule, return on investment; and/or regional economic development and job growth. Job growth may be expressed as jobs created per kilowatt hour or as jobs created per electrical vehicle supply equipment.

The method 1300 of the present invention can overcome widespread misunderstandings about EV battery safety, EV power on demand, energy consumption, and comparative efficiencies to the millions of combustion engine vehicles that are crippling the planet and economy.

The method is scalable. That is, the comparative analysis may be undertaken for any sized group of EV consumers, which in turn influences the size and/or number of vehicle clusters. Examples of calculated outputs for a community are represented in Table 1 and Table 2 which follow. Table 2 has been included as a single table in its entirety, and broken into Tables 2A, 2B, 2C and 2D which follow Table 2 for clarity.

TABLE 1

Output Report — Hendersonville, NC
Holistic (Social) Economics of EV Adoption - Based on Your EV Projections
RTS is targeting 2015 as the goal for the Asheville Metro Area to have infrastructure to support a vibrant EV marketplace. We apply industry accepted metrics to determine the amount of solar capacity needed to fuel forecasted EVs mileage, gasoline burned, money that stays local and new jobs.

| Based on Sales of Electric Vehicles | Electric Vehicle Miles Travelled Per Year | Gallons of Gasoline Not Burnt | Barrels of foreign Oil Not Imported | Number of jobs created (one job per $X spent) | Money that stays in Community with Locally Sourced Renewable Energy (.65) |
|---|---|---|---|---|---|
| 200 | 1,917,120 | 72,633 | 3,744 | 27 | $179,404 |

Environmental Benefits - Based on Your EV Projections
This table Illustrates a few of the environmental benefits associated with necessary solar supported EV infrastructure investment to support the forecasted 2015 EV market. Notice that EV's on today's grid will leave a considerable footprint, but offering a 42% reduction. Once powered with renewables, which have 0 emissions. In addition, there are many other externalized benefits like cleaner air and water, quieter roads and streamlined transportation infrastructure.

| Vehicle Cluster | Current CO2 Emissions of Gas Vehicles from Petroleum in Lbs. | Replacement EV CO2 Emissions from Average US Electrical Sources in Lbs. | EV C02 emissions on 100% Solar and other Renewable Energy in | Equivalent Acres of Trees to Absorb Carbon | Equivalent Tons of Waste Recycled |
|---|---|---|---|---|---|
| Hendersonville, NC | 1,183,984 | $497,273.39 | 1,183,984 | 135 | 33 |

Financial Benefits - Based on Your EV Projections
Now we know how much energy we need to produce from sunshine, what it will take to build and install the infrastructure, how much money is retained in community, and that once we realize fuel and vehicle operate and maintenance. Petroleum infrastructure costs are not included. Cost is based on $7.25 per watt of PV installed and includes sufficient chargers, which account for about 40% of Brightfield cost. The targeted payback from fuel and maintenance savings (EVs are 80% less expensive to drive, and have 60% lower maintenance costs.)

| Vehicle Cluster | KW of Solar PV to Install to Power ALL EV miles | Dollars to commit to build Solar-Supported EV Infrastructure (no incentives shown) | Acres of Parking Lot or Land to Designate for Solar PV | Dollars Not Spent on Gas for Replaced Vehicles | Number of Chargers Installed at Home and Public | Revenue Generated at Public Charging Stations |
|---|---|---|---|---|---|---|
| Hendersonville, NC | 556 | $4,027,778 | 3.9 | $276,006 | 300 | $47,928 |

TABLE 2

TIM Tool (patent-pending) Output Report  B → | | ← B  Customized by BrightfieldTS for: Solar Driven Experience

Logistical Attributes of Solar Driven Experience

Starting with averaged rental car data from U-Save and BCTDA (Vehicle's rented 290 days/yr, 1.7 people per car rental, average person spends $171/day and stays in Asheville for 2.8 days), we find some compelling statistics. Job creation numbers are conservatively based on BrightfieldTS experience (1 job per $10,000 spent on infrastructure.)

| | # of EV Additional Rentals in Fleet | EV Miles Travelled (based on 130 miles per rental) | Number of Vehicle Rental Days per Year | Individual Visitors Renting EV's | Number of Jobs Supported Through Brightfield™ Deployment |
|---|---|---|---|---|---|
| Year 1 | 8 | 303,680 | 2,336 | 1,393 | 144 |
| Year 2 | 8 | 607,360 | 4,672 | 2,787 | 144 |
| Year 3 | — | 607,360 | 4,672 | 2,787 | |
| Accumulated | 16 | 1,518,400 | 11,680 | 6,967 | 289 |

Environmental Attributes of Solar Driven Experience

Based on comparisons with equivalent internal combustion (32 mpg), we can conservatively illustrate how even a small fleet can create significant greenhouse gas reductions and reduce dependency on foreign oil within Buncombe County's economy. Interestingly, it will take very little land, or rooftops, to achieve 100% Solar Fuel.

| | Gallons of Gasoline Not Burnt | Pounds of CO2 missions eliminated when "Solar Driven" | Barrels of foreign Oil Not Imported | Equivalent Acres of Trees to Absorb Carbon | Equivalent Tons of Waste Recycled | CO2 Emissions from Replacement EV's on Average US Electrical Sources in Lbs. | EV CO2 emissions on 100% Solar and other Renewable Energy in Lbs. |
|---|---|---|---|---|---|---|---|
| Year 1 | 12,147 | 99,996 | 626 | 11 | 3 | 41,998 | 0 |
| 1 Year 2 | 24,294 | 199,992 | 1,252 | 23 | 6 | 41,998 | 0 |
| → Year 3 | 24,294 | 199,992 | 1,252 | 23 | 6 | 0 | 0 |
| — Accumulated | 60,736 | 499,979 | 3,131 | 57 | 14 | 3,201 | |

TABLE 2-continued

Financial Benefits of Solar Driven Experience

Utilizing scientific energy conversion formulas, BTS can determine vehicle energy demand on the grid based on 125-miles/day at 292-days per year (U-Save). We have designed, and are prepard to implement the necessary Solar and EV Charging Infrastructure to create a "Solar Driven" reality. EV renters who have chosen Asheville over other destinations will pump $171/day into Buncombe County. Based on a $5 charge event every 65 miles, BTS will attain steady revenue growth beyond 2015.

| | Buncombe County | | | | EV Rental Company | | Public | | BTS | | |
|---|---|---|---|---|---|---|---|---|---|---|---|
| | Cost of Brightfield ™ Solar Driven Experience | Tourist Dollars Spent by EV Renter's based on $171/day | Sales Tax generated based on @1.7 | Hotel Night Stays Generated (assuming 100% EV Renters stay in Buncombe County Hotel) | Net Fuel Savings to EV Rental Company/EV renter | Vehicle Maintenance Savings (based on $.02 Cents per EV, and $.05 per ICE-Argonne Labs and AAA) | Dollars Not Spent on Gasoline | Money that stays In Community with Brightfield Solar Fuel (.95 of Dollars formerly spent on Gasoline) | Brightfield Access at $10/day with Rental EV | Charge Event cost to Rental Company/EV renter at Brightfield ™, assuming, 65 miles per event, $5 per charge and 90% charging on Brightfield Network | Amount of Electricity Used in KW | Cost of Charge from grid |
| Year 1 | $1,442,521 | $679,075 | $18,335 | 3,971 | $21,258 | $9,110 | $48,589 | $45,188 | $23,360 | $27,331 | 85,030.40 | $9,353.34 |
| Year 2 | $1,442,521 | $1,358,150 | $36,670 | 7,942 | $42,515 | $18,221 | $97,178 | $90,375 | $46,720 | $54,662 | 170,060.80 | $18,706.69 |
| Year 3 | $0 | $1,358,150 | $36,670 | 7,942 | $42,515 | $18,221 | $97,178 | $90,375 | $46,720 | $54,662 | 170,060.80 | $18,706.69 |
| Accumulated | $2,885,042 | $3,395,376 | $91,675 | 19,856 | $106,288 | $45,552 | $242,944 | $225,938 | $116,800 | $136,656 | 425,152.0 | $46,766.72 |

Infrastructure Attributes of Solar Driven Experience

| | KW of Solar Energy needed to Fuel ALL EV Miles Travelled | # of Brightfields - Sites Served | Acres of Parking Lot or Land to create Solar Fuel, Actual Brightfield footprint will be far less. | Annual Number of Charge Events | Number of EV Rental Charges per Brightfield Per day | Number of Chargers Installed for SDE Customers and Public (Phase 1 and 2) |
|---|---|---|---|---|---|---|
| Year 1 | 73.0 | 15 | 0.5 | 6,073.60 | 1.14 | 28 |
| Year 2 | 146.0 | 29 | 1.0 | 12,147.20 | 1.14 | 28 |
| Year 3 | — | — | 0.0 | 12,147.20 | | |
| Accumulated | 146.0 | 29 | 1.0 | 30,368.0 | | 56 |

Including Existing Brightfield EVSE 66

TABLE 2A

TIM Tool (patent-pending) Output Report
Logistical Attributes of Solar Driven Experience
Starting with averaged rental car data from U-Save and BCTDA (Vehicle's rented 290 days/yr, 1.7 people per car rental, average perosn spend $171/day and stays in Asheville for 2.8 days), we find some compelling statistics. Job creation numbers are conservatively based on BrightfieldTS experience (1 job per $10,000 spent on infrastructure.)

|  | # of EV Additional Rentals in Fleet | EV Miles Travelled (based on 130 miles per rental) | Number of Vehicle Rental Days per Year | Individual Visitors Renting EV's | Number of Jobs Supported Through Brightfield ™ Deployment |
|---|---|---|---|---|---|
| Year 1 | 8 | 303,680 | 2,336 | 1,393 | 144 |
| Year 2 | 8 | 607,360 | 4,672 | 2,787 | 144 |
| Year 3 | — | 607,360 | 4,672 | 2,787 | — |
| Accumulated | 16 | 1,518,400 | 11,680 | 6,967 | 289 |

Environmental Attributes of Solar Driven Experience
Based on comparisons with equivalent internal combustion (32 mpg), we can conservatively illustrate how even a small fleet can create significant greenhouse gas reductions and reduce dependency on foreign oil within Buncombe County's economy. Interestingly, it will take very little land, or rooftops, to achieve 100% Solar Fuel.

|  | Gallons of Gasoline Not Burnt | Pounds of $CO_2$ Emissions eliminated when "Solar Driven" | Barrels of foreign Oil Not Imported | Equivalent Acres of Trees to Absorb Carbon | Equivalent Tons of Waste Recycled |
|---|---|---|---|---|---|
| Year 1 | 12,147 | 99,996 | 626 | 11 | 3 |
| Year 2 | 24,294 | 199,992 | 1,252 | 23 | 6 |
| Year 3 | 24,294 | 199,992 | 1,252 | 23 | 6 |
| Accumulated | 60,736 | 499,979 | 3,131 | 57 | 14 |

TABLE 2B

Financial Benefits of Solar Driven Experience
Utilizing scientific energy conversion formulas, BTS can determine vehicle energy demand on the grid based on 125-miles/day at 292-days per year (U-Save). We have designed, and are prepared to implement the necessary Solar and EV Charging Infrastructure to create a "Solar Driven" reality.

|  | Buncombe County | | | | EV Rental Company | |
|---|---|---|---|---|---|---|
|  | Cost of Brightfield ™ Solar Driven Experience | Tourist Dollars Spent by EV Renter's based on $171/day | Sales Tax generated based on @1.7 | Hotel Night Stays Generated (assuming 100% EV Renters stay in Buncombe County Hotel) | Net Fuel Savings to EV Rental Company/EV renter | Vehicle Maintenance Savings (based on $.02 Cents per EV, and $.05 per ICE- Argonne Labs and AAA) |
| Year 1 | $1,442,521 | $679,075 | $18,335 | 3,971 | $21,258 | $9,110 |
| Year 2 | $1,442,521 | $1,358,150 | $36,670 | 7,942 | $42,515 | $18,221 |
| Year 3 | $0 | $1,358,150 | $36,670 | 7,942 | $42,515 | $18,221 |
| Accumulated | $2,885,042 | $3,395,376 | $91,675 | 19,856 | $106,288 | $45,552 |

Infrastructure Attributes of Solar Driven Experience

|  | KW of Solar Energy needed to Fuel ALL EV Miles Travelled | # of Brightfields - Sites Served | Acres of Parking Lot or Land to create Solar Fuel, Actual Brightfield footprint will be far less. | Annual Number of Charge Events | Number of EV Rental Charges per Brightfield Per day | Number of Chargers Installed for SDE Customers and Public (Phase 1 and 2) |
|---|---|---|---|---|---|---|
| Year 1 | 73.0 | 15 | 0.5 | 6,073.60 | 1.14 | 28 |
| Year 2 | 146.0 | 29 | 1.0 | 12,147.20 | 1.14 | 28 |

TABLE 2B-continued

| Year 3 | — | — | 0.0 | 12,147.20 | — |
|---|---|---|---|---|---|
| Accumulated | 146.0 | 29 | 1.0 | 30,368.0 | 56 |

TABLE 2C

Customized by BrightfieldTS for: Solar Driven Experience

| CO2 Emissions from Replacement EV's on Average U.S. Electrical Sources in Lbs. | EV C02 emissions on 100% Solar and other Renewable Energy in Lbs. |
|---|---|
| 41,998 | 0 |
| 41,998 | 0 |
| 0 | 0 |
| 3,201 | |

TABLE 2D

| Public | | BTS Charge Event cost | | | |
|---|---|---|---|---|---|
| Dollars Not Spent on Gasoline | Money that stays In Community with Brightfield Solar Fuel (.95 of Dollars formerly spent on Gasoline) | Brightfield Access at $10/day with Rental EV | to Rental Company/ EV renter at Brightfield ™, assuming, 65 miles per event, $5 per charge and 90% charging on Brightfield Network | Amount of Electricity Used in KW | Cost of Charge from grid |
| $48,589 | $45,188 | $23,360 | $27,331 | 85,030.40 | $9,353.34 |
| $97,178 | $90,375 | $46,720 | $54,662 | 170,060.80 | $18,706.69 |
| $97,178 | $90,375 | $46,720 | $54,662 | 170,060.80 | $18,706.69 |
| $242,944 | $225,938 | $116,800 | $136,656 | 425,152.0 | $46,766.72 |

Including Existing Brightfield EVSE 66

The invention claimed is:

1. A customizable charging station, comprising:
at least one modular bollard assembly having a structural tubular form that is mountable upon a footing, said modular bollard assembly includes a tubular central portion having a hollow inner cavity,
a first end portion and a second end portion, said first end portion having a first expansion plate welded thereto closing said first end of said hollow inner cavity,
said first expansion plate having a first plurality of apertures therethrough,
said first plurality of apertures constructed and arranged to cooperate with a vertically extending structural trunk member,
a second expansion plate welded to said second end of said tubular central portion,
said second expansion plate extending outside of a perimeter of said tubular central portion and including a second plurality of apertures therethough,
said second plurality of apertures positioned outside the perimeter of said tubular central portion, said second expansion plate constructed and arranged to cooperate with said footing for securing said modular bollard assembly to said footing with fasteners extending through said second plurality of apertures, said tubular central portion including a receiving port through a side wall thereof; said side wall window sized and shaped to include electrical vehicle supply equipment, said side wall of said central tubular member being constructed of a material and having a sufficient strength to function as a structural support member of an overhead structure.

2. The customizable charging station of claim 1 wherein said structural trunk member is pointed to prevent debris from settling on the top surface of said modular bollard assembly.

3. The customizable charging station of claim 1 wherein said structural trunk member is an extended structural trunk member for support of an overhead structure.

4. The customizable charging station of claim 1 wherein said expansion cap is secured to said first expansion plate with fasteners, said fasteners extending through said plurality of apertures.

5. The customizable charging station of claim 3, wherein said second end including at least one attachment point for a functional unit.

6. The customizable charging station of claim 5 wherein said functional unit is an overhead structure.

7. The customizable charging station of claim 6 wherein said overhead structure includes at least one photovoltaic panel secured thereon.

8. The customizable charging station of claim 6 wherein said overhead structure is a canopy, said canopy including a single vertical support member, said modular bollard assembly forming a portion of said vertical support member.

9. The customizable charging station of claim 6 wherein said overhead structure is a canopy, said canopy including a plurality of vertical support members, at least one said modular bollard assembly forming a portion of each said vertical support member.

10. The customizable charging station of claim 1 wherein said electrical vehicle supply equipment includes a housing and a bezel sealed with a gasket therebetween, said bezel attaching substantially flush to a face of said housing.

11. The customizable charging station of claim 1 wherein said modular bollard assembly includes a service entrance, said service entrance a point of electric utility grid interconnection.

12. The customizable charging station of claim 10, wherein the energy supply unit is fashioned with a cord wrap bezel.

13. The customizable charging station of claim 1, wherein the foundation comprises a concrete footing or at least one geotechnical screw.

14. The customizable charging station of claim 8, wherein said canopy is modular, expandable, and installed in a predetermined orientation.

15. A customizable charging station, comprising:
at least one modular bollard having a form that is mountable upon a footing at one or more bollard attachment points upon a bollard attachment plate, and having at least one expansion attachment element fashioned on a bollard expansion plate, said modular bollard assembly includes a tubular central portion having a hollow inner cavity, a first end portion and a second end portion, said first end portion having said bollard expansion plate welded thereto closing said first end of said hollow inner cavity, said bollard expansion plate having a plurality of apertures therethrough, said apertures constructed and arranged to cooperate with a vertically extending structural trunk, a second expansion plate welded to said second end of said tubular central portion, said second expansion plate extending outside of a perimeter of said tubular central portion and including a plurality of apertures therethrough, said apertures positioned outside the perimeter of said tubular central portion, said second expansion plate constructed and arranged to cooperate with said footing for securing said modular bollard assembly to said footing, said tubular central portion including a receiving port through a side wall thereof, said side window sized and shaped to cooperate with said electrical vehicle supply equipment, said side wall of said central tubular member being constructed of a material and having a sufficient strength to function as a structural support member of an overhead structure.

16. The customizable charging station of claim 15, wherein the electrical vehicle supply equipment provides grid-based electricity to a vehicle.

17. The customizable charging station of claim 15, wherein the energy supply unit is fashioned with a cord wrap bezel.

18. The customizable charging station of claim 15, wherein the foundation comprises a concrete footing or at least one geotechnical screw.

19. The customizable charging station of claim 15, the modular bollard further comprising an internal cavity and a panel that provides access to said internal cavity.

20. The customizable charging station of claim 15, wherein said bollard expansion plate at said first end of said structural trunk is fixedly engaged with a functional unit.

21. The customizable charging station of claim 20, wherein the functional unit comprises a canopy, a security lamp, a surveillance camera, and/or a beam or a joist.

* * * * *